(12) United States Patent
Hagiwara et al.

(10) Patent No.: US 9,415,795 B2
(45) Date of Patent: Aug. 16, 2016

(54) STEERING APPARATUS

(71) Applicant: NSK Ltd., Tokyo (JP)

(72) Inventors: Wataru Hagiwara, Maebashi (JP);
Masaya Jouta, Maebashi (JP); Hideki Kojima, Isesaki (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/438,876

(22) PCT Filed: Oct. 10, 2014

(86) PCT No.: PCT/JP2014/077202
§ 371 (c)(1),
(2) Date: Apr. 27, 2015

(87) PCT Pub. No.: WO2015/064345
PCT Pub. Date: May 7, 2015

(65) Prior Publication Data
US 2016/0167694 A1    Jun. 16, 2016

(30) Foreign Application Priority Data

| Oct. 31, 2013 | (JP) | 2013-226950 |
| Oct. 31, 2013 | (JP) | 2013-226951 |
| Dec. 24, 2013 | (JP) | 2013-265311 |
| Dec. 25, 2013 | (JP) | 2013-266940 |
| Jan. 6, 2014 | (JP) | 2014-000304 |

(51) Int. Cl.
*B62D 1/19* (2006.01)
*B62D 1/184* (2006.01)

(52) U.S. Cl.
CPC ............... *B62D 1/195* (2013.01); *B62D 1/184* (2013.01); *B62D 1/192* (2013.01)

(58) Field of Classification Search
CPC ......... B62D 1/195; B62D 1/192; B62D 1/184
See application file for complete search history.

(56) References Cited

U.S. PATENT DOCUMENTS 4,892,330 A * 1/1990 Beauch ............... B62D 1/184
280/775
5,560,650 A * 10/1996 Woycik ............... B62D 1/192
280/777

(Continued)

FOREIGN PATENT DOCUMENTS

| EP | 1634796 A1 | 3/2006 |
| EP | 1762462 A1 | 3/2007 |

(Continued)

OTHER PUBLICATIONS

International Search Report from International Patent Application No. PCT/JP2014/077202, Jan. 6, 2015.

(Continued)

*Primary Examiner* — Ruth Ilan
(74) *Attorney, Agent, or Firm* — Shapiro, Gabor and Rosenberger, PLLC

(57) ABSTRACT

A steering apparatus is disclosed, the apparatus including friction plates 23, 24a, 24b clamped by a clamping bolt 10 together with a clamp portion and a vehicle-sided bracket 6 to extend toward a rear side of a vehicle in an axial direction; and a holding member 20 fitted on an inner column 3 and connected to portions, on the rear side of the vehicle, of the friction plates 23, 24a, 24b, the holding member 20 and the inner column 3 being connected together via shearing pins 21a, 21b, the shearing pins being sheared into fracture upon receiving a predetermined level of impact force to enable a more stable and lower separating load to be acquired.

8 Claims, 24 Drawing Sheets

(56) References Cited

U.S. PATENT DOCUMENTS

| | | | | |
|---|---|---|---|---|
| 5,876,065 | A * | 3/1999 | Ogura | B62D 1/197 280/777 |
| 6,134,982 | A * | 10/2000 | Takabatake | B62D 1/184 280/777 |
| 2006/0125224 | A1* | 6/2006 | Higashino | B62D 1/192 280/777 |
| 2007/0068311 | A1* | 3/2007 | Shimoda | B62D 1/195 74/493 |
| 2008/0042420 | A1* | 2/2008 | Ali | B62D 1/184 280/775 |
| 2011/0210536 | A1* | 9/2011 | Monteil | B62D 1/195 280/775 |
| 2013/0133460 | A1* | 5/2013 | Uesaka | B62D 1/195 74/492 |
| 2015/0239489 | A1* | 8/2015 | Matsuno | B62D 1/187 74/493 |
| 2015/0314801 | A1* | 11/2015 | Gstohl | B62D 1/195 74/493 |
| 2015/0353123 | A1* | 12/2015 | Jyota | B62D 1/187 74/493 |

FOREIGN PATENT DOCUMENTS

| | | |
|---|---|---|
| JP | 02-064469 U | 5/1990 |
| JP | 2001-278069 A | 10/2001 |
| JP | 2003-276616 A | 10/2003 |
| JP | 2004-034883 A | 2/2004 |
| JP | 2006-131047 A | 5/2006 |
| JP | 2007-030527 A | 2/2007 |
| JP | 2007-069800 A | 3/2007 |
| JP | 2009-132358 A | 6/2009 |
| JP | 2011-105230 A | 6/2011 |
| WO | WO 2004-108502 A1 | 12/2004 |

OTHER PUBLICATIONS

Written Opinion of the ISA from International Patent Application No. PCT/JP2014/077202, Jan. 6, 2015.

English Translation of International Preliminary Report on Patentability from International Patent Application No. PCT/JP2014/077202, mailed May 12, 2016.

* cited by examiner

FIG. 9A
FIG. 9B
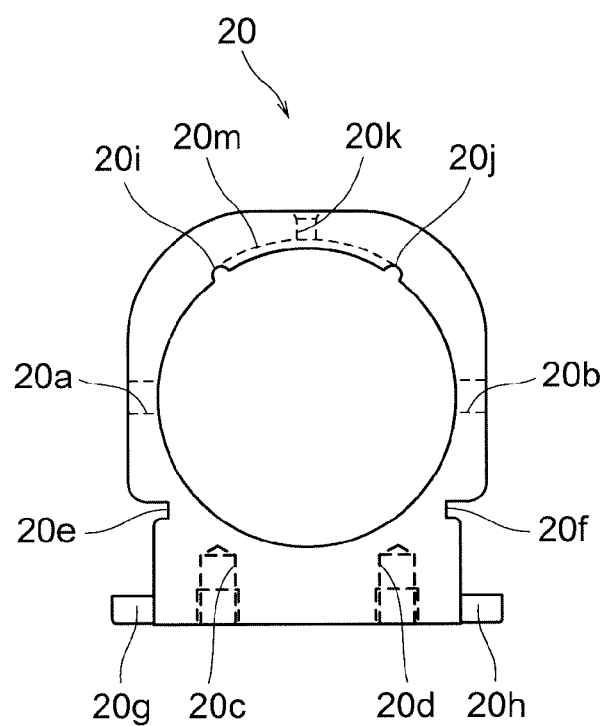
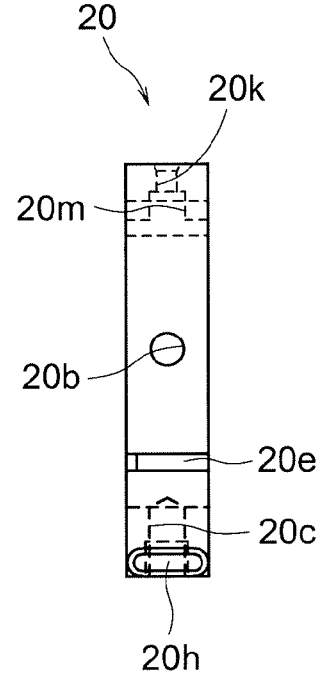

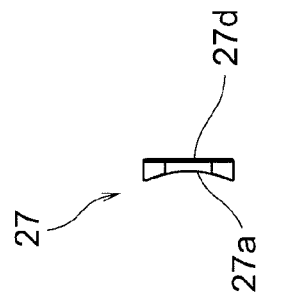
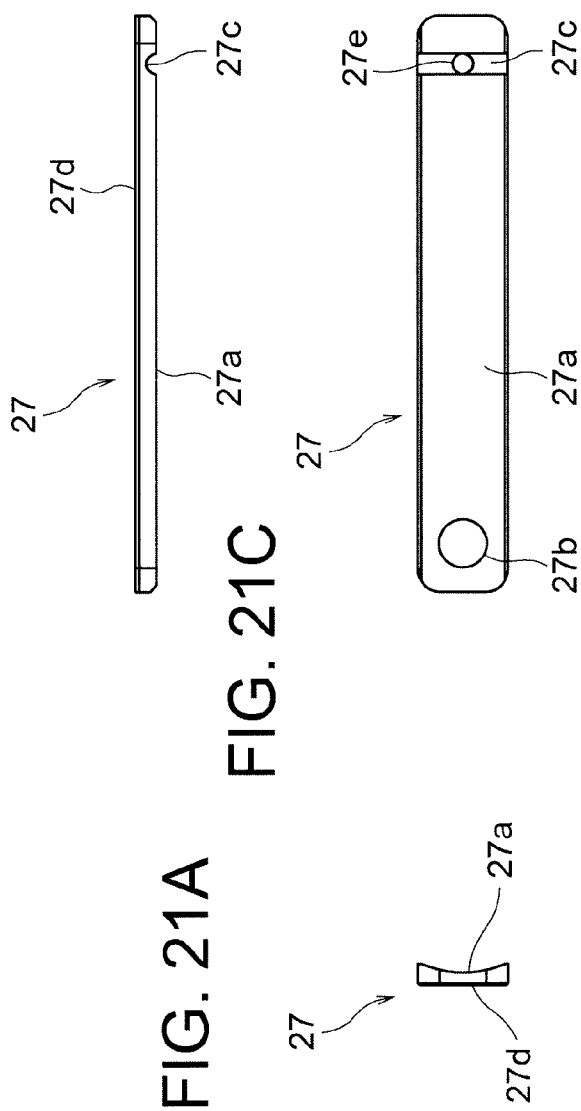
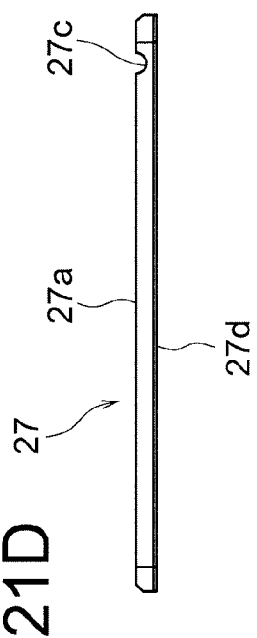
FIG. 21E
FIG. 21B
FIG. 21C
FIG. 21D
FIG. 21A

STEERING APPARATUS

TECHNICAL FIELD

The present invention relates to a steering apparatus equipped in a vehicle etc and capable of adjusting telescopic positions of a steering wheel, in other words, positions in substantially front and rear directions of a vehicle and a tilt position, i.e., a position in a substantially heightwise direction in accordance with a physical constitution and a driving posture of a driver.

BACKGROUND ART

A conventional steering apparatus has existed so far, the apparatus including a mechanism to reduce a damage to the driver while moderating an impact exerted on the driver by displacing the steering wheel toward a front of the vehicle upon the driver's colliding with the steering wheel due to an accident of collision.

For example, as in Patent literature 1 given below, there exists a steering apparatus including a nut fitted to a lower portion of an inner column on an upper side as a driven portion for making a telescopic adjustment, the nut being attached separably based on an impact load applied upon a secondary collision.

Further, as in Patent literature 2 given below, there exists a steering apparatus that absorbs an impact energy upon the secondary collision by an impact absorbing wire of which a rear end hangs on a clamping bolt around or by deforming a support groove receiving insertion of the clamping bolt upon the secondary collision.

Moreover, as in Patent literature 3 given below, there exists a steering apparatus formed with a bottomed groove extending in the axial direction in bilateral surfaces of the inner column and having a depth becoming smaller as getting closer to a rear side of a vehicle, and provided with a pin fixed to an outer column so that a tip thereof contacts a front side of the bottomed groove.

Still further, as in Patent literature 4 given below, there exists a steering apparatus equipped with a clamping device to firmly clamp a column to a vehicle body fitting bracket by use of a friction plate, the configuration being such that fixation of the friction plate is cancelled upon a part of the friction plate being deformed when a predetermined or larger level of impact force acts due to an impact load.

PRIOR ART LITERATURES

Patent Literatures

Patent literature 1: Japanese Patent Application Laid-Open Publication No. 2007-30527
Patent literature 2: Japanese Patent Application Laid-Open Publication No. 2001-278069
Patent literature 3: Japanese Utility Model Publication No. H02-64469
Patent literature 4: Japanese Patent Application Laid-Open Publication No. 2007-69800

SUMMARY OF THE INVENTION

Problems to be Solved by the Invention

The conventional technologies, however, have an apprehension that a load for a column on a rear side of the vehicle to separate from a fixed state for absorbing the impact of the secondary collision, i.e., a separating load differs respectively on both sides of the column in a widthwise direction of the vehicle, and the column is twisted to increase the separating load to some extent, resulting in inability of stably acquiring an intended separating load.

Another apprehension is that a contact pressure of a fixing portion of the column on the rear side of the vehicle changes due to the load caused in a tilt direction upon the secondary collision, and friction force changes to cause a slight variation of the separating load, resulting in the inability of stably acquiring the intended separating load.

It is an object of the present invention in view of the problems described above to provide a steering apparatus capable of acquiring a more stable and lower separating load.

Means for Solving the Problems

In order to solve the problems described above, the present invention provides a steering apparatus including:
a steering shaft transferring steering force;
an inner column rotatably supporting a portion, on a rear side of a vehicle, of the steering shaft;
an outer column rotatably supporting a portion, on a front side of the vehicle, of the steering shaft and having:
a clamp portion slidably fitted onto the inner column and clamping and declamping the inner column; and a tilt pivot disposed on the front side of the vehicle and rotatably fitted to a vehicle body;
a vehicle-sided bracket pinching and fixing both sides of the clamp portion in a widthwise direction of the vehicle to the vehicle body and unlocking the locked clamp portion, and making the inner column and the outer column pivotable about the tilt pivot; and
a clamping bolt for clamping the clamp portion and the vehicle-sided bracket in the widthwise direction of the vehicle corresponding to an operation of a user, and declamping the clamp portion and bracket,
wherein the steering apparatus further comprises: a friction plate having an elongate hole extending in an axial direction and receiving insertion of the clamping bolt and being clamped by the clamping bolt together with the clamp portion and the vehicle-sided bracket to extend toward the rear side of the vehicle in the axial direction; and a holding member fitted on the inner column and connected to a portion, on the rear side of the vehicle, of the friction plate,
the holding member and the inner column are connected together via a shearing pin, and
the shearing pin is sheared into fracture upon receiving a predetermined level of impact force.

This configuration enables acquisition of a more stable and lower separating load than those of the conventional steering apparatuses.

Preferably, the steering apparatus further includes a second shearing pin connecting the holding member and the inner column together, the shearing pin and the second shearing pin being disposed in a face-to-face relationship in a widthwise direction of a vehicle. The stable separation can be thereby attained by reducing, even when a load to lift upward the steering column upon the secondary collision occurs, influence of this load on the separating load.

Further preferably, the holding member takes an annular shape to receive internal fitting of the inner column, and a resin is interposed between an upper portion of the holding member and the inner column. With this contrivance, it is feasible to prevent the load to lift upward the steering column upon the secondary collision from generating a large level of friction force between the inner column and the holding member. In other words, the resin can reduce the friction caused when the inner column separates from the holding member, corresponding to the variation in a direction of the load owing to elasticity thereof.

Still further, preferably, the resin is injection-molded after the holding member has been fitted on the inner column. With this contrivance, a backlash between the holding member and the inner column can be eliminated while absorbing manufacturing errors of the holding member and the inner column.

Yet further, preferably, the resin has a fixing portion making use of elasticity thereof and is fixed to the holding member via the fixing portion after being molded. With this contrivance, the resin can be easily attached to the holding member.

Furthermore, preferably, the fixing portion engages with a hole formed to penetrate the holding member in a radial direction. With this contrivance, the resin can be further easily attached to the holding member.

Moreover, preferably, the fixing portion embraces the upper portion of the holding member from an inside in the radial direction of the holding member. With this contrivance, the resin can be still further easily attached to the holding member, and a contact between the holding member and the inner column can be prevented in a broad range, whereby the friction caused when separated can be reduced more surely.

In addition, preferably, the steering apparatus further includes a support member fixed to the inner column, at least a part of the support member being interposed between the holding member and the inner column, the shearing pin being received in a through-hole portion formed through the support member and the holding member. With this contrivance, it is feasible to aggregate means for eliminating backlash and reducing friction between the holding member and the inner column by the resin and the shearing pins at one portion. Further, the inner column can be smoothly moved upon the secondary collision by preventing the deformation of the inner column when forming the through-hole because of having no necessity for forming the through-hole to receive the insertion of the shearing pin in the inner column.

Effect of the Invention

The present invention can provide the steering apparatus capable of acquiring the more stable and lower separating load.

BRIEF DESCRIPTION OF THE DRAWINGS

FIG. 9A is a side view illustrating a side surface of an annular member of the steering apparatus according to the second embodiment of the present application as viewed in the axial direction from the rear side of the vehicle; FIG. 9B is a side view illustrating a side surface of the annular member as viewed in the widthwise direction of the vehicle;

FIG. 21A is a view illustrating a side surface of the support member, on the front side of the vehicle, of the steering apparatus according to the sixth embodiment of the present application; FIG. 21B is a view illustrating a side surface on the left side thereof; FIG. 21C is a view illustrating a lower surface thereof; FIG. 21D is a view illustrating a side surface on the right side thereof; FIG. 21E is a view illustrating a side surface on the rear side of the vehicle;

MODE FOR CARRYING OUT THE INVENTION

First Embodiment

Figure 1:
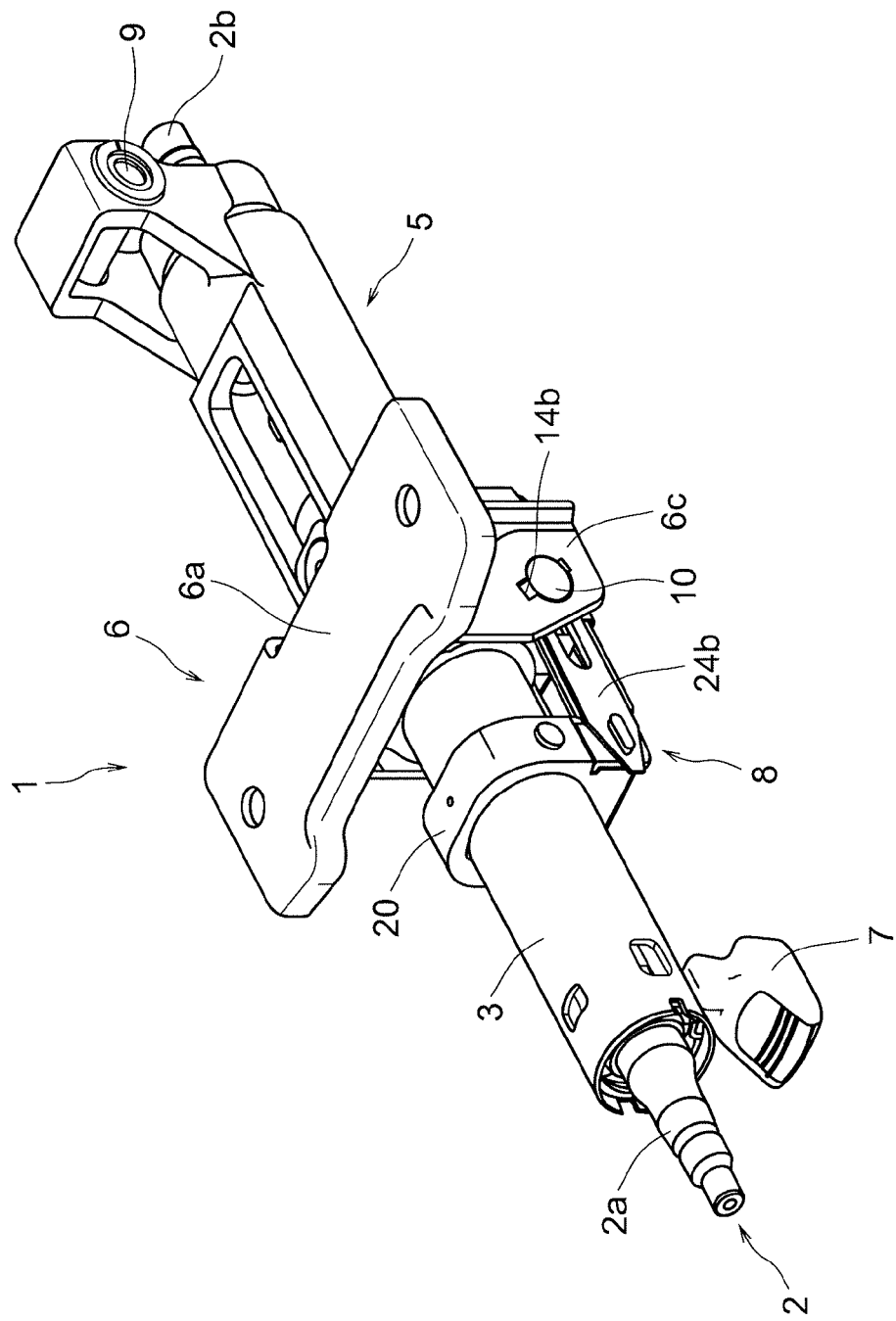
FIG. 1 is a perspective view illustrating a steering apparatus according to a first embodiment of the present application.

A steering apparatus 1 according to a first embodiment of the present application will hereinafter be described with reference to FIGS. 1 to 7 inclusive. FIG. 1 is a perspective view illustrating the steering apparatus 1 according to the first embodiment of the present application.

The steering apparatus 1 includes: a steering shaft 2 transferring rotations of unillustrated steering wheel fitted to a rear side of a vehicle, i.e., fitted to a leftward front side as viewed in FIG. 1 to a front side of the vehicle, i.e., a rightward depthwise side as viewed in FIG. 1; an inner column 3 rotatably supporting a portion, on the rear side of the vehicle, of the steering shaft 2; an outer column 5 receiving a portion, on the front side of the vehicle, of the inner column 3 and rotatably supporting a portion, on the front side of the vehicle, of the steering shaft 2; a vehicle-sided bracket 6 disposed along the periphery, on the rear side of the vehicle, of the outer column 5 and fixing the steering apparatus 1 to the vehicle; an operation lever 7 used for locking and unlocking a tilt position and a telescopic position of the unillustrated steering wheel; and a reinforcing unit 8 reinforcing the fixation of the inner column.

The steering shaft 2 is configured to include: an upper shaft 2a disposed on the rear side of the vehicle, the steering wheel being fitted to the upper shaft 2a; and a lower shaft 2b being spline-engaged with the upper shaft 2a on the front side of the vehicle. Note that a direction in which the steering shaft 2 extends is referred to as an "axial direction" in the present application.

A tilt pivot 9 serving as a center of a tilt rotation is provided on an upper portion, on the front side of the vehicle, of the outer column 5. When a driver operates the unlocking with the operation lever 7, the steering apparatus 1 is enabled to rotate about the tilt pivot 9.

The vehicle-sided bracket 6 is configured to include: an upper plate portion 6a disposed above a vehicle rear side portion of the outer column 5 and fixed to a vehicle body in an undetachable manner; and side plate portions 6b, 6c extending respectively on both sides, in a widthwise direction of the vehicle, of the outer column 5 from the upper plate portion 6a. The side plate portions 6b, 6c are formed with elongate holes 14a, 14b each taking a circular arc with the tilt pivot 9 being centered, a clamping bolt 10 passing through the elongate holes 14a, 14b. Note that the elongate hole 14a is not illustrated in FIG. 1.

Figure 2:
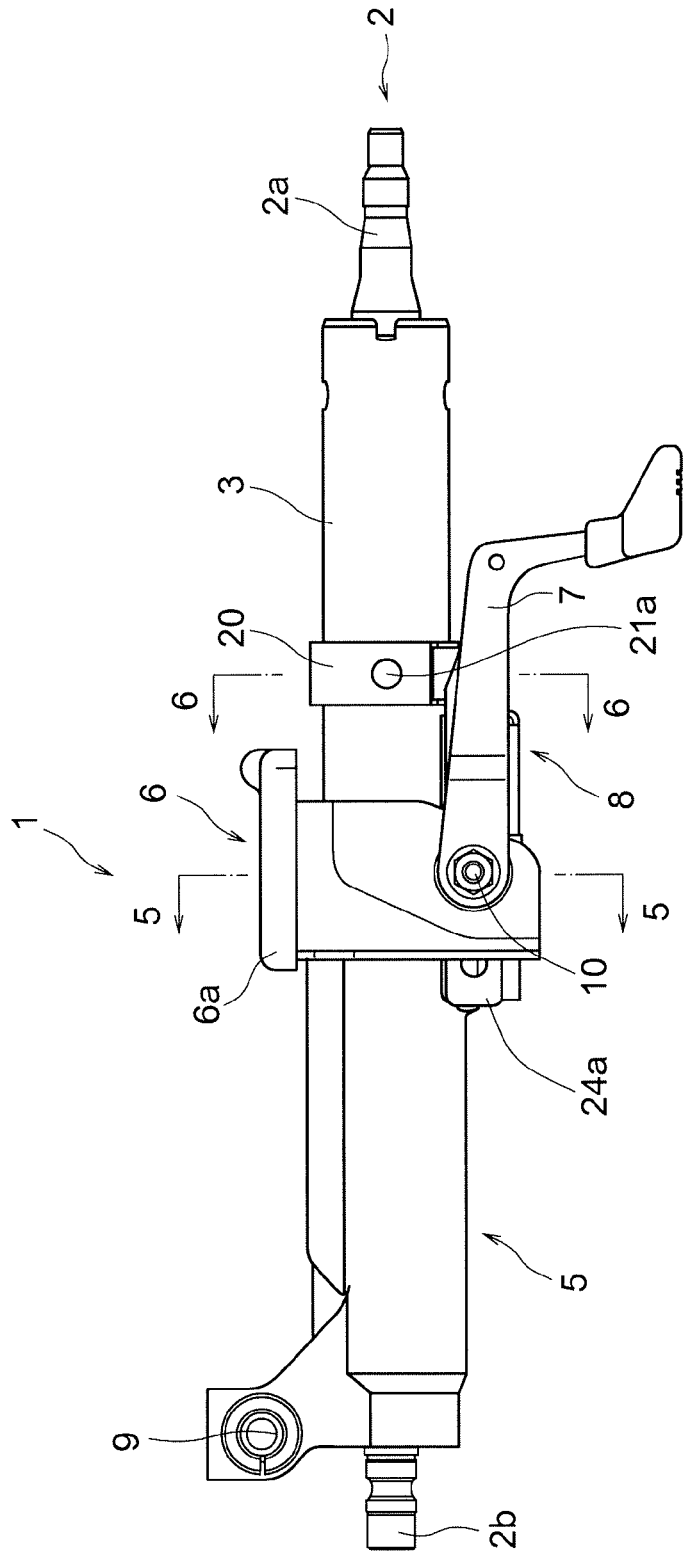
FIG. 2 is a side view illustrating the steering apparatus according to the first embodiment of the present application.

FIG. 2 is a side view of the steering apparatus 1 according to the first embodiment of the present application. FIG. 2 illustrates side surfaces of the left side of the steering apparatus 1 as viewed from the rear side of the vehicle.

The operation lever 7 is fixed to the clamping bolt 10 and is operated to cause the clamping bolt 10 to fasten the side plate portions 6b, 6c closely together, thereby restricting movements thereof in tilt and telescopic directions.

Figure 3:
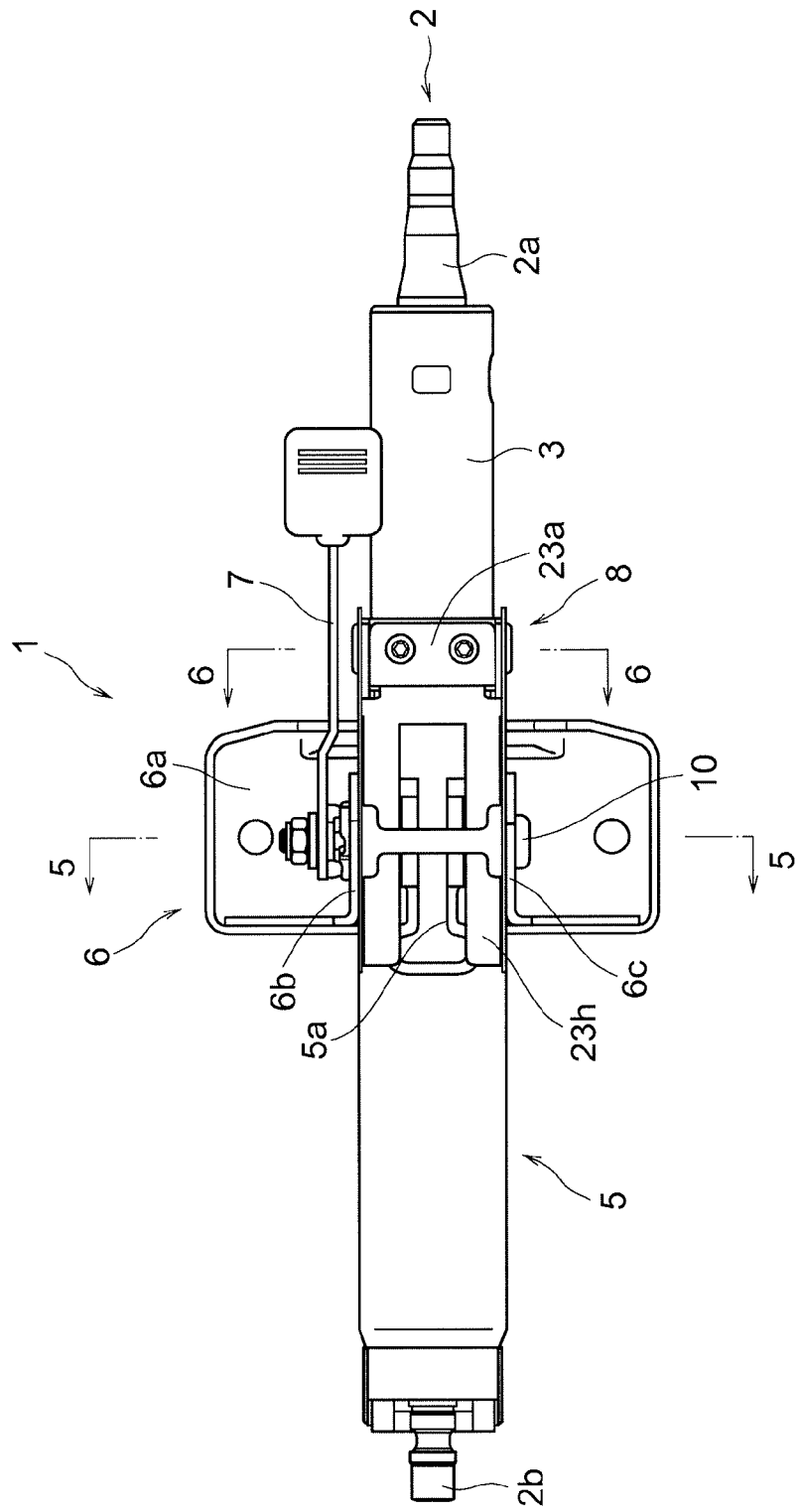
FIG. 3 is a bottom view illustrating the steering apparatus according to the first embodiment of the present application.

FIG. 3 is a bottom view of the steering apparatus 1 according to the first embodiment of the present application.

A slit portion 5a configuring a slit extending in the axial direction and spreading in a peripheral direction at an end portion on the front side of the vehicle, is formed at a lower portion, on the rear side of the vehicle, of the outer column 5. The slit portion 5a allows a portion, on the rear side of the vehicle, of the outer column 5 to become elastically deformed to reduce a diameter thereof, thus enabling the inner column 3 to be fastened corresponding to the clamping by the clamping bolt 10.

Figure 4:
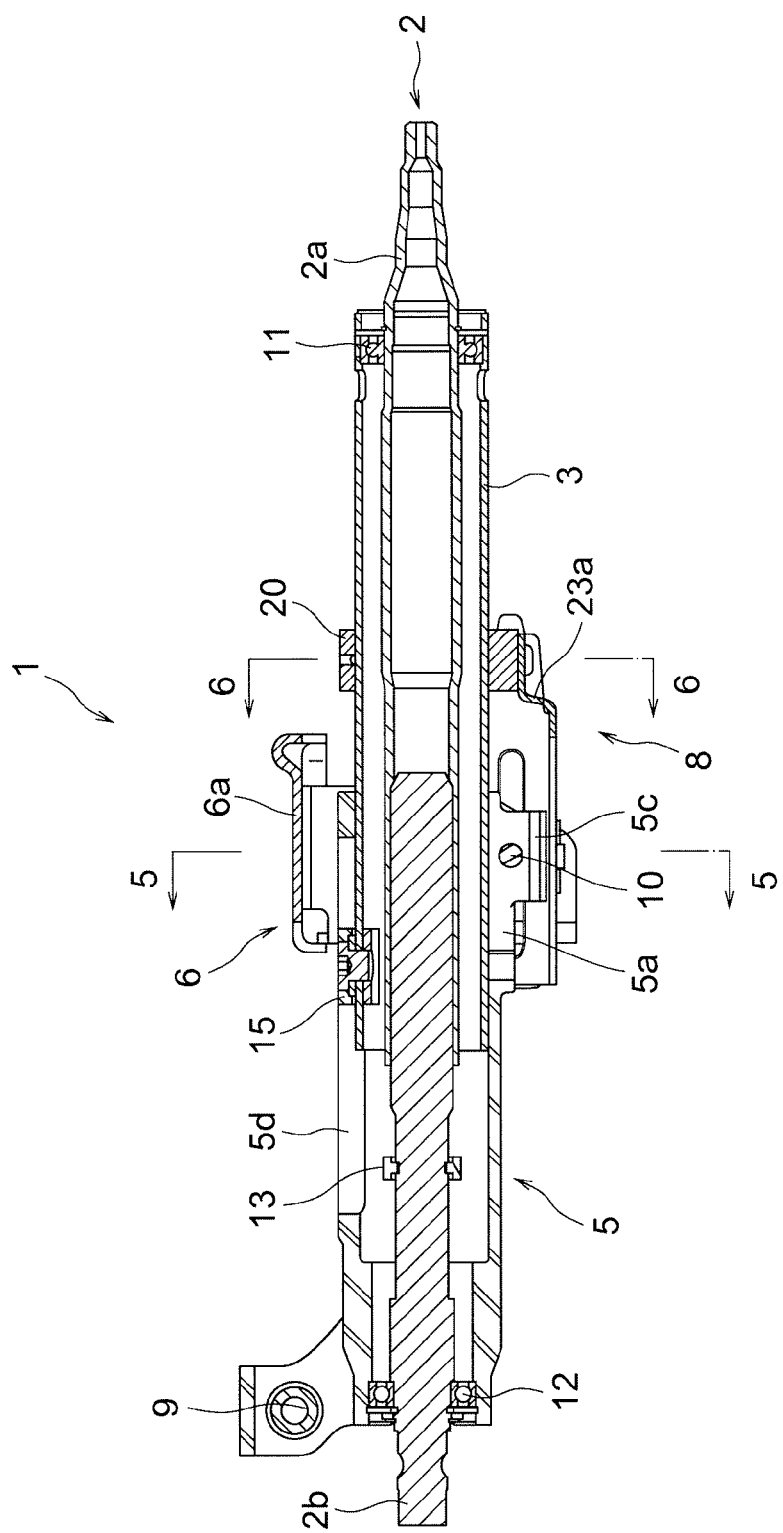
FIG. 4 is a sectional view illustrating a cut-off plane vertical to a central axis of the steering apparatus according to the first embodiment of the present application.

FIG. 4 is a sectional view depicting a vertical plane cut along a central axis of the steering apparatus 1 according to the first embodiment of the present application. FIG. 4 is the view of a right-sided portion in a widthwise direction of the vehicle as viewed from the left side.

The upper shaft 2a is formed in a cylindrical shape, while the lower shaft 2b is formed in a column shape, and a portion, on the rear side of the vehicle, of the lower shaft 2b is fitted in a portion, on the front side of the vehicle, of the upper shaft 2a, thus attaining the spline-engagement between the upper shaft 2a and the lower shaft 2b at these portions. The steering shaft 2 is thereby enabled to change its length when making a telescopic adjustment and when relaxing an impact upon a secondary collision.

A rear-sided bearing 11 fixed by a C-ring is fitted in the vicinity of an end portion, on the rear side of the vehicle, of the inner column 3. The upper shaft 2a is rotatably supported by the rear-sided bearing 11. The upper shaft 2a is fixed to the inner column 3 to be disabled from relatively moving in the axial direction but allowed to move together with the inner column 3 in the axial direction.

The C-ring, a washer and an O-ring are disposed in this sequence from the front side of the vehicle in the vicinity of the end portion, on the front side of the vehicle, of the outer column 5 to eliminate a backlash, and a front-sided bearing 12 for making alignment against a deviation from the center of the spline engagement is also fitted in the vicinity thereof. The lower shaft 2b is rotatably supported by the front-sided bearing 12.

Protruded portions 5b, 5c each protruding downward are formed at a lower portion of the slit portion 5a of the outer column 5. The clamping bolt 10 passes through a hole formed to penetrate a boundary portion in the widthwise direction of the vehicle between the slit portion 5a and the protruded portions 5b, 5c. Note that the protruded portion 5b is not illustrated in FIG. 4.

A resinous stopper 13 is fitted on substantially a center of the lower shaft 2b in the axial direction. The stopper 13 serves to restrict a further movement of the upper shaft 2a toward the front side of the vehicle when making the telescopic adjustment. The stopper 13 is configured to become detached upon receiving a fixed or greater level of impact due to the secondary collision. Note that the invention may adopt a configuration of not providing the stopper 13.

The outer column 5 includes an elongate portion 5d configuring an elongate hole penetrating in a radial direction and extending in the axial direction, the elongate portion 5d being formed on the upper side of the outer column 5. A resinous spacer 15 is disposed on an inner side of the elongate portion 5d, the spacer 15 being fixed by a bolt to the upper portion, on the front side of the vehicle, of the inner column 3. The spacer 15 engages with a side surface of the elongate portion 5d to restrain a rotation of the inner column 3, further engages with a portion, on the rear side of the vehicle, of the elongate portion 5d to define a maximum draw-out quantity when making the telescopic adjustment, and performs a role of a guide for guiding a direction of the movement of the inner column 3 upon the secondary collision. The stopper 13 and the spacer 15 being resinous, it is feasible to restrain noises caused when making the telescopic adjustment.

Figure 5:
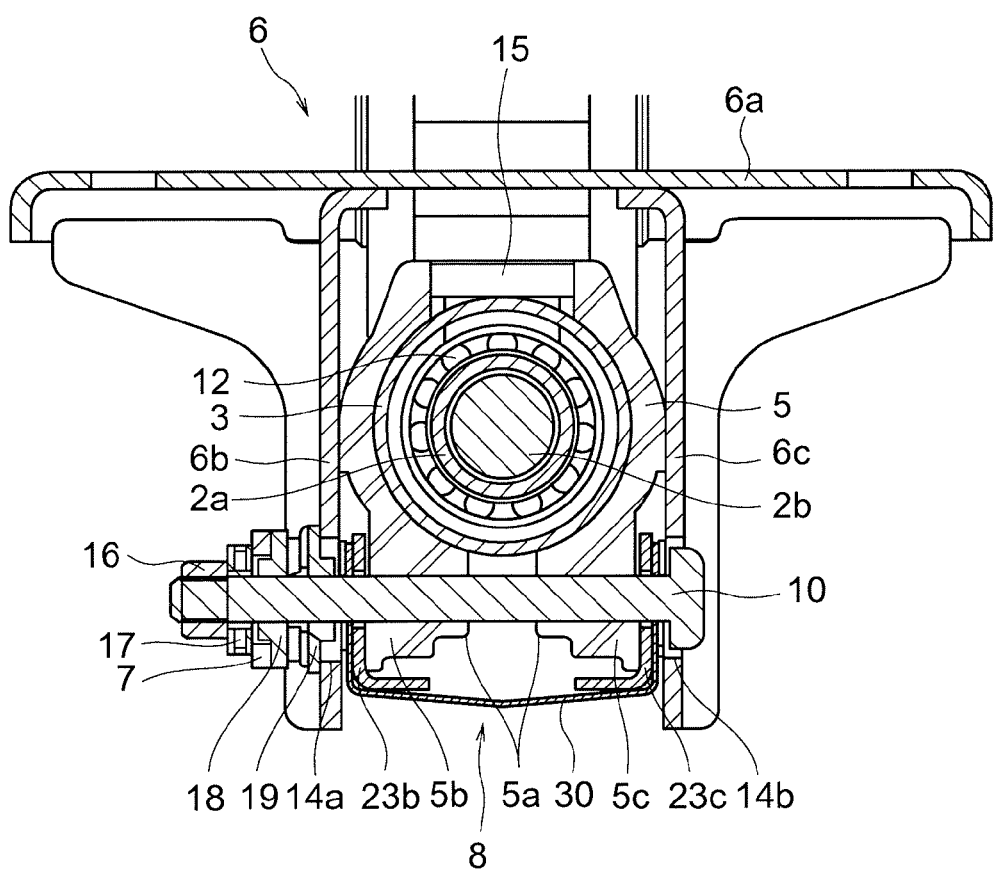
FIG. 5 is a sectional view illustrating a section, taken along a line 5-5 depicted in FIGS. 2 to 4 inclusive, of the steering apparatus according to the first embodiment of the present application.

FIG. 5 is a sectional view of the steering apparatus 1 according to the first embodiment of the present application, illustrating a section taken along a line 5-5 depicted in FIGS. 2 to 4 inclusive.

The outer column 5 has a clamp portion, inclusive of the slit portion 5a and the protruded portion 5b, disposed in the vicinity of the clamping bolt 10, the clamp portion configuring a clamping unit elastically becoming deformed to clamp and clutch the inner column 3.

Side surfaces, on both sides in the widthwise direction of the vehicle, of the outer column 5 slide on surfaces, opposite to each other, of the side plate portions 6b, 6c of the vehicle-sided bracket 6 when adjusting the tilt position.

A nut 16 is screwed to a shank, on the left side of the vehicle, of the clamping bolt 10. A thrust bearing 17, the operation lever 7, a movable cam 18 fixed to the operation lever 7 in a relative rotation disabled manner, a fixed cam 19 corresponding to the movable cam 18 and fitted in the elongate hole 14a of the side plate portion 6b in the unrotatable manner, the side plate portion 6b serving as a pinching portion and apart of an after-mentioned reinforcing unit 8 are interposed in this sequence from the nut 16 between the nut 16 and the protruded portion 5b of the outer column 5. The reinforcing unit 8 serves to reinforce fixation of the inner column 3.

A part of the reinforcing unit 8 and the side plate portion 6c serving as the pinching portion together with the side plate portion 6b are further interposed in this sequence from the protruded portion 5b between the protruded portion 5b of the outer column 5 and a head of the clamping bolt 10.

When a driver operates the operation lever 7 up and down with the clamping bolt 10 being centered, the movable cam 18 and the fixed cam 19 repulse mutually or mesh with each other, thus clamping and declamping the members interposed between the nut 16 and the head of the clamping bolt 10.

Figure 6:
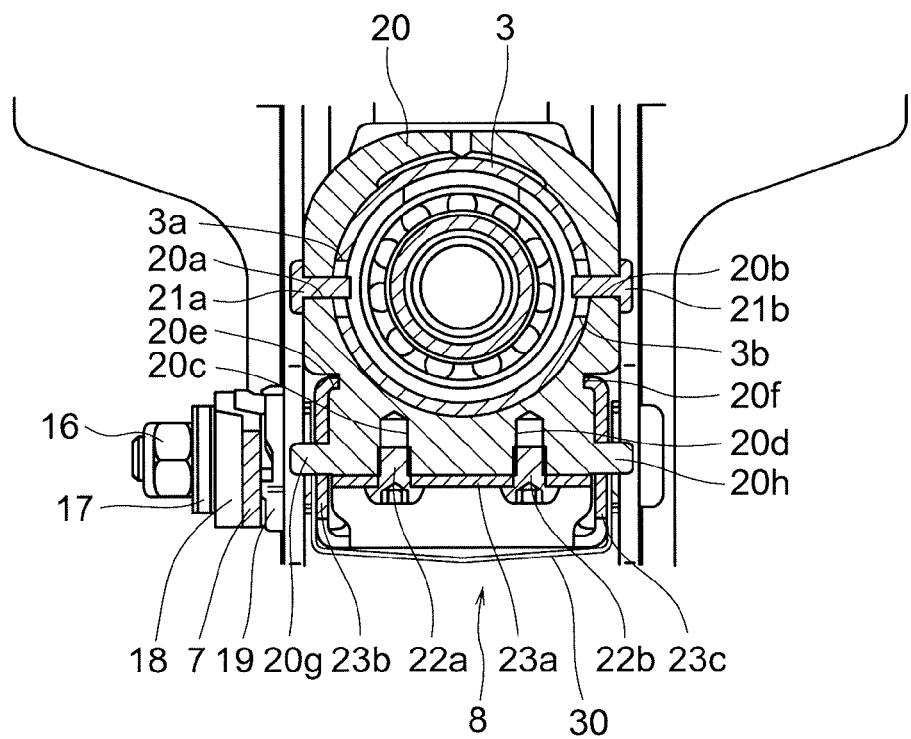
FIG. 6 is a sectional view illustrating a section, taken along a line 6-6 depicted in FIGS. 2 to 4 inclusive, of the steering apparatus according to the first embodiment of the present application.

FIG. 6 is a sectional view of the steering apparatus 1 according to the first embodiment of the present application, illustrating a section taken along a line 6-6 depicted in FIGS. 2 to 4 inclusive.

A metallic annular member 20 serving as a hold member to hold the inner column 3 is loosely fitted on substantially an intermediate portion of the inner column 3 in the axial direction. A couple of through-holes 20a, 20b penetrating in the radial direction are formed on laterally both sides of the annular member 20 in the widthwise direction of the vehicle, and a couple of through-holes 3a, 3b penetrating through in the radial direction are also provided in portions, corresponding to the through-holes 20a, 20b, of the inner column 3.

Shearing pins 21a, 21b are inserted into the through-holes 20a, 20b, 3a, 3b provided in the annular member 20 and the inner column 3. The shearing pins 21a, 21b have disc-like heads and cylindrical shanks extending vertically on one sides from centers of the heads, the shanks being inserted into the through-holes 20a, 20b, 3a, 3b.

A lower portion of the annular member 20 is formed thicker than side and upper portions thereof and is configured to receive attaching of other members of the reinforcing unit 8. To be specific, the configuration is such that screw holes 20c, 20d are formed from downward to upward in the thick portion, and screws 22a, 22b are screwed in the screw holes 20c, 20d, thereby fitting a fitting portion 23a of an after-mentioned inner friction plate 23 to the annular member 20.

Further, recessed portions 20e, 20f being recessed inward from both outer sides in the widthwise direction of the vehicle are formed in a boundary portion between the lower thick portion and the upper portion above this thick portion of the annular member 20. Upper inwardly bent end portions of after-mentioned rising portions 23b, 23c of the inner friction plate 23 are caught in the recessed portions 20e, 20f.

Moreover, protruded portions 20g, 20h protruding on laterally both sides in the widthwise direction of the vehicle and each taking an oblong shape being elongate in the axial direction, are formed on both side surfaces, in the widthwise direction of the vehicle, of the lower end of the annular member 20. Open slots 23d, 23e respectively formed in portions, on the rear side of the vehicle, of the rising portions 23b, 23c of the inner friction plate 23, are fitted on the protruded portions 20g, 20h, and further elongate holes 25a, 25b formed in after-mentioned outer friction plates 24a, 24b are further fitted on the protruded portions 20g, 20h from outside in the widthwise direction of the vehicle.

Figure 7:
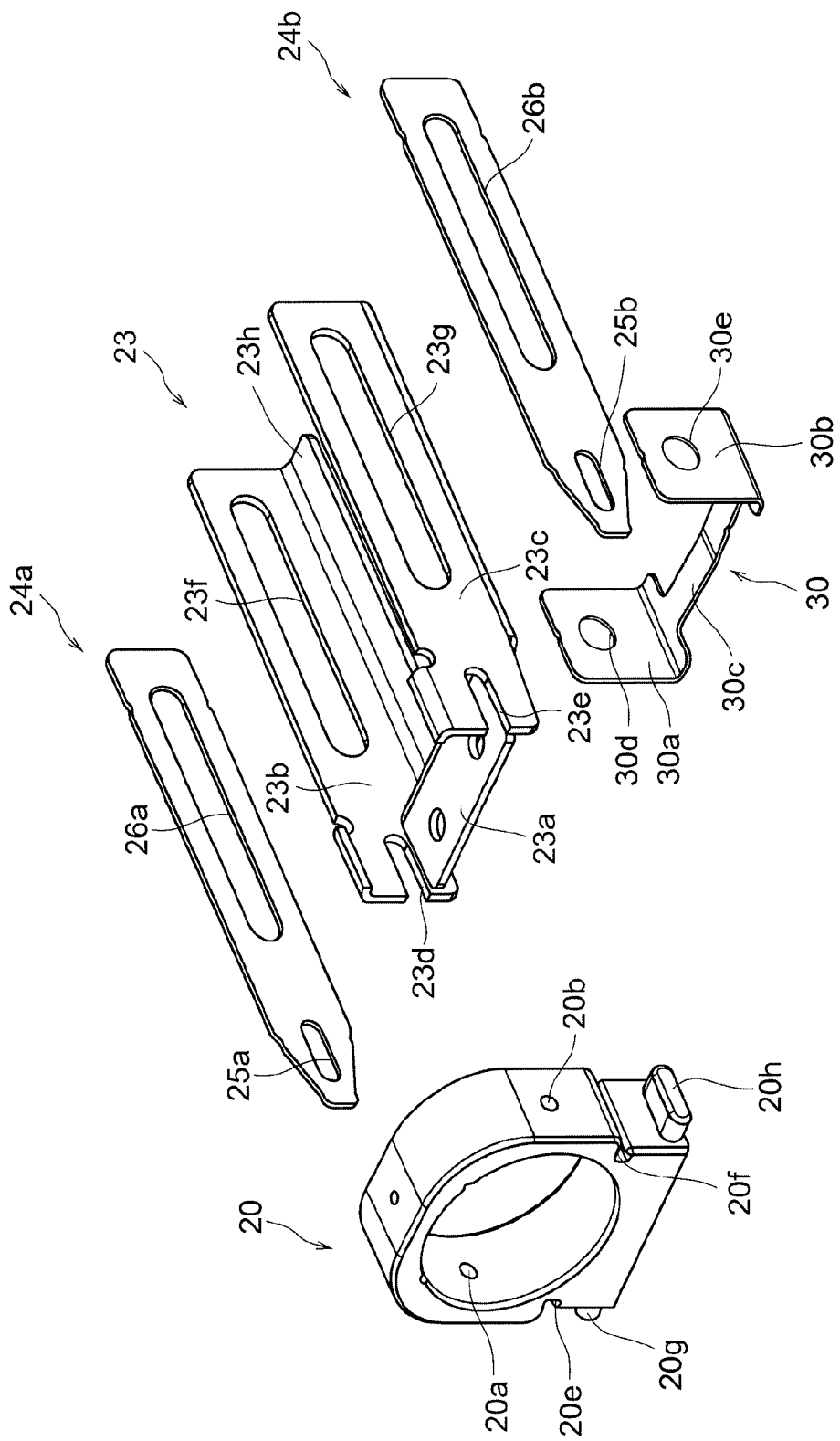
FIG. 7 is an exploded perspective view illustrating a reinforcing unit for reinforcing fixation of a steering wheel of the steering apparatus according to the first embodiment of the present application.

FIG. 7 is an exploded perspective view illustrating the reinforcing unit 8 to restrict the movement, in the telescopic direction, of the steering apparatus 1 according to the first embodiment of the present application. The illustration of FIG. 7 is that the leftward near side corresponds to the rear side of the vehicle, while the rightward depthwise side corresponds to the front side of the vehicle.

The reinforcing unit 8 is configured to include the annular member 20, the inner friction plate 23, the couple of outer friction plates 24a, 24b and an intermediate friction plate 30.

The inner friction plate 23 composed of a metal plate member includes the fitting portion 23a fitted to the lower portion of the annular member 20, the rising portions 23b, 23c extending in the axial direction on both sides in the widthwise direction of the vehicle, and a couple of elongate hole portions 23f, 23g formed in the rising portions 23b, 23c and configuring elongate holes being elongate in the axial direction. Upper end portions, on the rear side of the vehicle, of the rising portions 23b, 23c protrude more upward than other portions and are bent inward. The inwardly bent portions of the lower portions of the rising portions 23b, 23c and a forwardly extending portion extending toward the front side of the vehicle from a lower end of a downwardly bent portion of the fitting portion 23a bent downwardly from the front side of the vehicle are integrally formed, thus configuring a lower surface portion 23h as depicted in FIG. 3.

The outer friction plates 24a, 24b are composed of metal plate members and take substantially rectangular shapes. Elongate hole portions 25a, 25b corresponding to the protruded portions 20g, 20h are formed in portions, on the rear side of the vehicle, of the outer friction plates 24a, 24b, and elongate hole portions 26a, 26b being elongate in the axial direction are configured corresponding respectively to the elongate hole portions 23f, 23g of the inner friction plate 23 on the more front side of the vehicle than the elongate hole portions 25a, 25b.

The intermediate friction plate 30 composed of the metal plate member includes: upwardly extended friction portions 30a, 30b interposed between the rising portions 23b, 23c of the inner friction plate 23 and the outer friction plates 24a, 24b; and a connecting portion 30c to connect together lower portions of the friction portions 30a, 30b. The friction portions 30a, 30b are formed respectively with a round holes 30d, 30e through which the clamping bolt 10 passes.

The reinforcing unit 8 built up by the components described above is, as described above, configured by assembling the inner friction plate 23 and the outer friction plates 24a, 24b on the annular member 20. The assembly is made so that the annular member 20 is fitted on the inner column 3; the elongate hole portion 26a of the outer friction plate 24a, the friction portion 30a of the intermediate friction plate 30 and the elongate hole portion 23f of the inner friction plate 23 are interposed between the side plate portion 6b of the vehicle-sided bracket 6 and the protruded portion 5b of the outer column 5; and the elongate hole portion 23g of the inner friction plate 23, the friction portion 30b of the intermediate friction plate 30 and the elongate hole portion 26b of the outer friction plate 24b are interposed between the side plate portion 6c of the vehicle-sided bracket 6 and the protruded portion 5c of the outer column 5.

The clamping bolt 10 passes through the elongate hole portion 26a of the outer friction plate 24a, the round holes 30d, 30e of the intermediate friction plate 30, the elongate hole portions 23f, 23g of the inner friction plate 23 and the elongate hole portion 26b of the outer friction plate 24b.

When the driver declamps the clamping bolt 10 by operating the operation lever 7, the clamping bolt 10 is enabled to move substantially in up-and-down directions within the elongate holes formed in the side plate portions 6b, 6c of the vehicle-sided bracket 6, whereby the tilt adjustment can be made. Further, simultaneously with this operation, the fixation of the inner friction plate 23 and the outer friction plates 24a, 24b and the clamping of the clamp portion against the inner column 3 are also canceled. The driver is thereby enabled to make the tilt adjustment and the telescopic adjustment by operating the operation lever 7 once.

On the other hand, when the driver performs the clamping operation using the clamping bolt 10 by operating the operation lever 7, the up-and-down movements of the clamping bolt 10 are restricted, resulting in inability of making the tilt adjustment. Furthermore, when the driver performs the clamping operation of the clamping bolt 10 by operating the operation lever 7, the inner column 3 is firmly fixed owing to the fixation by the annular member 20 held by the inner friction plate 23 and the outer friction plates 24a, 24b in addition to the clamping by the clamp portion of the outer column 5.

Upon occurrence of the secondary collision that the driver collides with the steering wheel due to the collision of the vehicle, impact force acting on the front side of the vehicle in the axial direction occurs in the inner column 3. The shearing pins 21a, 21b are sheared by this impact force, resulting in releasing the inner column 3 from the fixation by the annular member 20. The inner column 3 is thereby enabled to move on the front side of the vehicle in the axial direction by only the friction with the clamp portion of the outer column 5. Further, in the first embodiment, the annular member 20 fixes the inner column 3, thereby eliminating a necessity for firmly clamping the inner column 3 with the clamp portion of the outer column 5 and lessening the clamping of the clamp portion of the outer column 5. This contrivance reduces the friction force caused between the inner column 3 and the clamp portion of the outer column 5 upon the secondary collision, and also decreases a separating load.

The thus-configured steering apparatus 1 according to the first embodiment of the present application is capable of absorbing the impact with the stable and low separating load even when an vehicle occupant having a relatively lightweight encounters the secondary collision. In particular, the shearing pins 21a, 21b are disposed in the vicinity of the connecting portion among the inner friction plate 23, the outer friction plates 24a, 24b and the annular member 20, thereby preventing a strong moment load from acting on the annular member 20 due to the impact of the secondary collision but allowing the impact force to be transferred directly to the shearing pins 21a, 21b with the result that the low separating load can be stably acquired.

The steering apparatus 1 according to the first embodiment is capable of steering because of the column not coming off even after absorbing the impact of the secondary collision.

Moreover, the steering apparatus 1 according to the first embodiment is capable of ensuring steering stability by causing the reinforcing unit 8 to firmly fix the inner column 3 to improve rigidity of the column against vibrations.

Furthermore, the steering apparatus 1 according to the first embodiment is capable of preventing the fixing force due to the friction from becoming different on left side and the right side in the widthwise direction of the vehicle and also the separating load from augmenting due to the column becoming twisted upon the secondary collision because of the inner friction plate 23 and the outer friction plates 24a, 24b being configured integrally by the annular member 20.

Still further, the steering apparatus 1 according to the first embodiment is capable of acquiring the stable separating load without any variation of the separating load even when the load is applied to the column to move upward due to the secondary collision.

Note that the discussion has been made by exemplifying the specific embodiment for describing the invention of the present application, however, a variety of modifications and improvements can be attained without being limited to the first embodiment.

For example, as described above, the shearing pins 21a, 21b may be, though provided preferably in the vicinity of the connecting position among the inner friction plate 23, the outer friction plates 24a, 24b and the annular member 20, provided at the lower portion of the annular member 20 and may also be provided at both of the bilateral portions and the lower portions thereof. Moreover, the number of shearing pins may be set "1" or equal to or more than "3" without being limited to "2". Further, the shearing pins 21a, 21b are molded of resin to reduce the weight and can be thus sized to a degree not causing any obstacle against the assembly, and come-off preventive molding can be also carried out. Metallic pins and aluminum pins are also available for use.

Furthermore, as for the number of friction plates, without being limited to the two plates on one side with the intermediate friction plate being sandwiched, an available configuration is that the single friction plate is provided on one side without providing the intermediate friction plate or that the three or more friction plates are provided one one side while providing the two or more intermediate friction plates. Further, the friction plates may be disposed on any one side and may also be disposed outwardly of the side plate portions 6b, 6c of the vehicle-sided bracket 6.

Second Embodiment

Next, a second embodiment of the present application will be described. The second embodiment of the present application is different from the first embodiment in terms of only such a point that the upper portion of the annular member 20 is filled with a resin 29, and, with other configurations being the same as those of the first embodiment, this resin 29 will be explained by using the same reference numerals and symbols as those in the first embodiment while omitting the redundant explanations of the components other than the resin 29.

Figure 8:
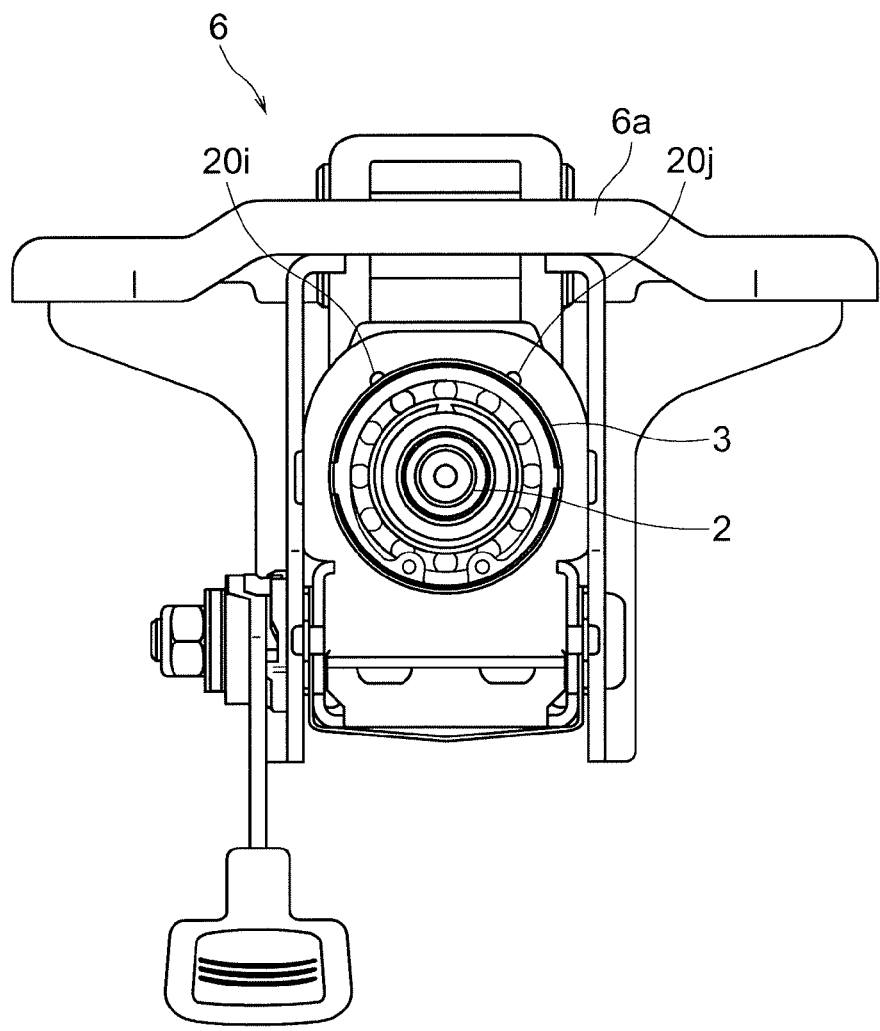
FIG. 8 is a side view of the steering apparatus as viewed in an axial direction from a rear side of a vehicle according to a second embodiment of the present application.

FIG. 8 is a side view of the steering apparatus 1 according to the second embodiment of the present application as viewed from the rear side of the vehicle.

A couple of air vent portions 20i, 20j are formed with spaced apart in the upper portion of the annular member 20, the air vent portions being recessed outwardly in the radial directions in an inner peripheral surface of the annular member 20 and forming a gap extending in the axial direction between the annular member 20 and the inner column 3.

Figure 10A:
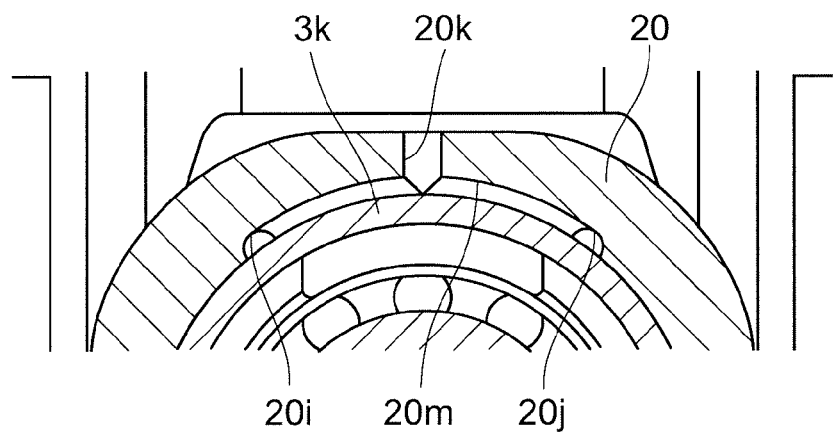
FIG. 10A is an enlarged sectional view of a resin reservoir portion of the steering apparatus according to the second embodiment of the present application, illustrating a state before filling of the resin.
Figure 10B:
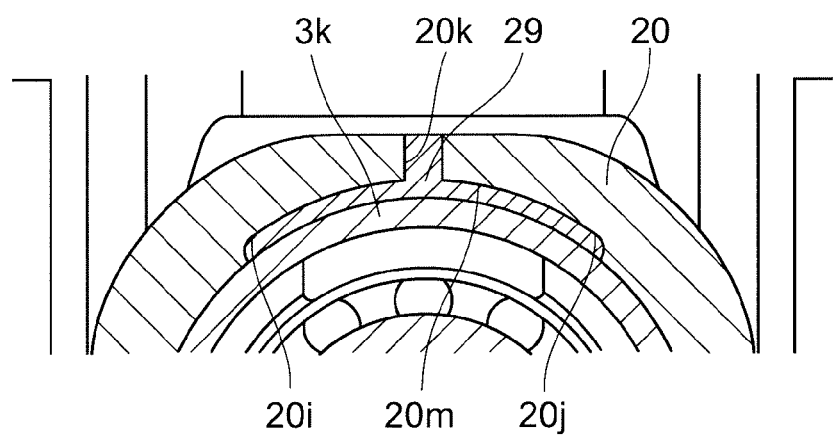
FIG. 10B is an enlarged sectional view of the resin reservoir portion, illustrating a state after the filling of the resin.

FIGS. 9A and 9B are side views each illustrating the annular member 20 of the steering apparatus 1 according to the second embodiment of the present application. FIG. 9A depicts a side surface as viewed in the axial direction from the rear side of the vehicle, and FIG. 9B illustrates a side surface as viewed in the widthwise direction of the vehicle. Further, FIGS. 10A and 10B are enlarged sectional views each depicting a resin reservoir portion of the steering apparatus 1 according to the second embodiment of the present application. FIG. 10A illustrates a state before being filled with the resin 29, while FIG. 10B illustrates a state after being filled with the resin 29.

The annular member 20 is formed with an injection hole 20$k$ penetrating an upper central portion in the radial directions.

Further, the annular member 20 is formed with a resin reservoir portion 20$m$ enlarging in diameter at the center in the axial direction between the air vent portion 20$i$ and the air vent portion 20$j$ and forming a gap taking a circular arc between the annular member 20 and the inner column 3.

The resin 29 is injected by applying an injection pressure from the injection hole 20$k$ and fills a portion between the resin reservoir portion 20$m$ and the inner column 3, thus conducting injection molding. The resin 29 is injected till reaching an overflow from the air vent portions 20$i$, 20$j$, thereby enabling the resin 29 to surely fill an air gap throughout between the resin reservoir portion 20$m$ and the inner column 3.

The injection molding of the resin 29 being conducted as described above, the inner column 3 is pressed by a pressure of the resin 29 against the inner peripheral surface of the lower portion of the annular member 20, whereby the backlash can be eliminated. With this contrivance, the backlash can be eliminated without additionally forming the through-hole in the inner column 3, and an extra friction load can be prevented from being applied thereto with keeping high roundness of the inner column 3.

Furthermore, the resin 29 being interposed between the annular member 20 and the inner column 3, the resin 29 facilitates a slide between the inner column 3 and the annular member 20 and can prevent the separating load from increasing even when a load acting upwardly in the tilt direction is applied upon the secondary collision to press the inner column 3 against the upper portion of the inner peripheral surface of the annular member 20.

The steering apparatus 1 having the configuration described above according to the second embodiment is capable of absorbing the impact with the stable and low separating load even when the vehicle occupant having the relatively light weight encounters the secondary collision. Particularly, the shearing pins 21$a$, 21$b$ are disposed in the vicinity of the connecting portion among the inner friction plate 23, the outer friction plates 24$a$, 24$b$ and the annular member 20, thereby preventing the strong moment load from acting on the annular member 20 due to the impact of the secondary collision but allowing the impact force to be transferred directly to the shearing pins 21$a$, 21$b$ with the result that the low separating load can be stably acquired.

The steering apparatus 1 according to the second embodiment is capable of steering because of the column not coming off even after absorbing the impact of the secondary collision.

Moreover, the steering apparatus 1 according to the second embodiment is capable of ensuring the steering stability by causing the reinforcing unit 8 to firmly fix the inner column 3 to improve the rigidity of the column against the vibrations.

Furthermore, the steering apparatus 1 according to the second embodiment is capable of preventing the fixing force due to the friction from becoming different on left side and the right side in the widthwise direction of the vehicle and also the separating load from augmenting due to the column becoming twisted upon the secondary collision because of the inner friction plate 23 and the outer friction plates 24$a$, 24$b$ being configured integrally by the annular member 20.

Still further, the steering apparatus 1 according to the second embodiment is capable of acquiring the stable separating load without any variation of the separating load even when the load is applied to the column to move upward due to the secondary collision.

Third Embodiment

Next, a third embodiment of the present application will be described. The third embodiment of the present application is different from the first embodiment in terms of only such a point that the resin is interposed between the annular member 20 and the inner column 3, and, with other configurations being the same as those of the first embodiment, the resin will be described by omitting the redundant explanations thereof.

The third embodiment of the present application involves using a resin pad molded beforehand matching with an internal shape of the injection hole of the annular member and an internal shape of the resin reservoir portion. To be specific, the resin pad is configured to include: a circular arc portion received in the resin reservoir portion; and a fixing portion protruding upward from the upper central portion of the circular arc portion and received in the injection hole. A plurality of minute projections projecting in the radial directions is provided on an upper surface of the circular arc portion of the resin pad. The resin pad is fitted toward an upper side from an inside-diametrical side of the annular member. With this contrivance, the same effects as those of the second embodiment can be acquired.

Note that the discussion has been made by exemplifying the specific embodiments for describing the invention of the present application, however, the invention of the present application can be modified and improved in a variety of modes without being limited to the second and third embodiments.

For example, the resin may be injected in the annular member from the widthwise direction of the vehicle and from other directions instanced by the radial directions without being limited to from upward.

Further, as mentioned above, the shearing pins 21$a$, 21$b$ may be, though preferably provided in the vicinity of the connecting portion among the inner friction plate 23, the outer friction plates 24$a$, 24$b$ and the annular member 20, provided at the lower portion of the annular member 20 and may also be provided at both of the bilateral portions and the lower portions thereof without being limited to the bilateral sides in the widthwise direction of the vehicle as in the embodiments discussed above. Moreover, the number of shearing pins may be set "1" or equal to or more than "3" without being limited to "2". Further, the shearing pins 21$a$, 21$b$ are molded of resin to reduce the weight and can be thus sized to a degree not causing any obstacle against the assembly, and come-off preventive molding can be also carried out. Metallic pins and aluminum pins are also available for use.

Furthermore, as for the number of friction plates, without being limited to the two plates on one side with the intermediate friction plate being sandwiched, an available configuration is that the single friction plate is provided on one side without providing the intermediate friction plate or that the three or more friction plates are provided on one side while providing the two or more intermediate friction plates. Further, the friction plates may be disposed on any one side and may also be disposed outwardly of the side plate portions 6b, 6c of the vehicle-sided bracket 6.

Fourth Embodiment

Next, a fourth embodiment of the present application will be described. The fourth embodiment of the present application is different from the first embodiment in terms of only a point of disposing a resin pad 227 between the annular member 20 and the inner column 3, and, with other configurations being the same as those of the first embodiment, this resin 227 will be described by using the same reference numerals and symbols as those in the first embodiment while omitting the redundant explanations of the components other than the resin pad 227.

Figure 11:
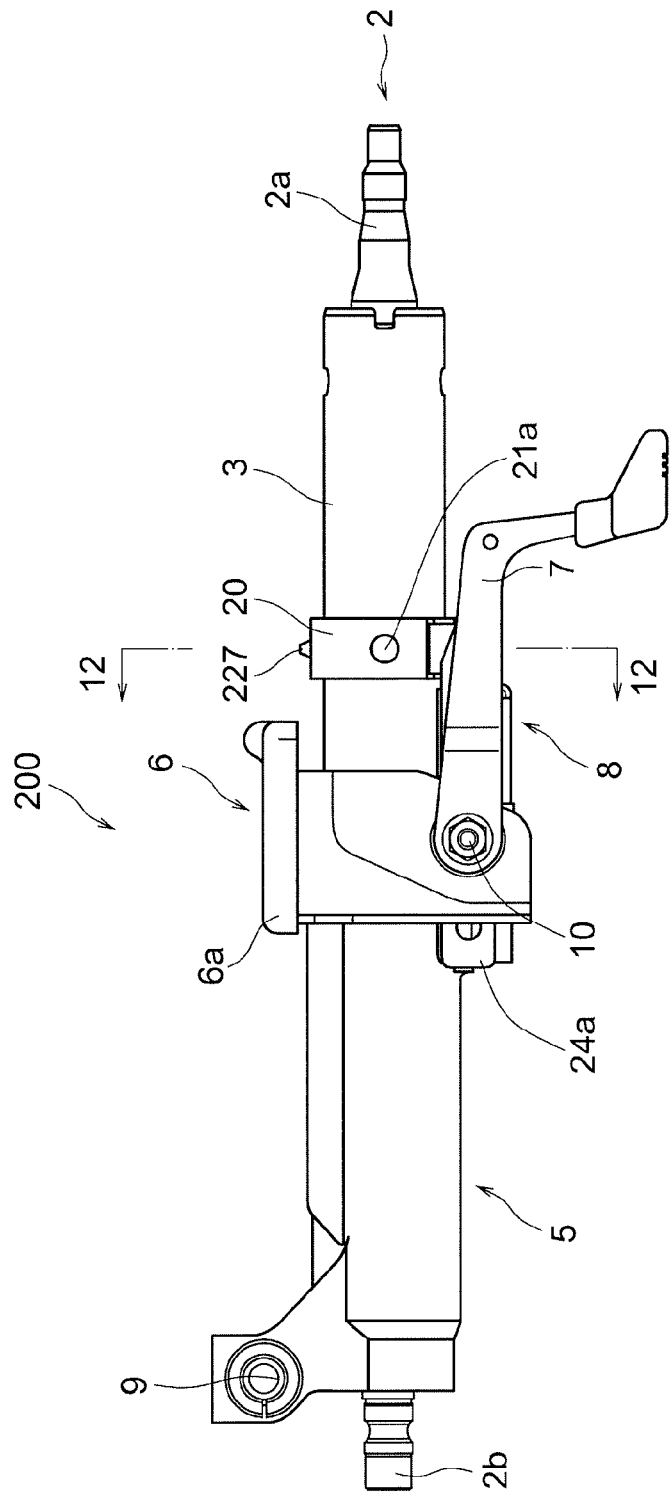
FIG. 11 is a side view illustrating the steering apparatus according to a fourth embodiment of the present application.

FIG. 11 is a side view illustrating a steering apparatus 200 according to the fourth embodiment of the present application. FIG. 11 illustrates side surfaces on the left side of the steering apparatus 200. In FIG. 11, when viewed from a direction of normally reading the reference numerals and symbols, the left side as facing the drawing corresponds to the front side of the vehicle, while the right side as facing the drawing corresponds to the rear side of the vehicle.

The fourth embodiment of the present application involves using the resin pad 227 previously molded matching with internal shapes of an upper hole 20k and the resin reservoir portion 20m of the annular member 20. As depicted in FIG. 11, a part of the resin pad 227 protrudes upward from the upper portion of the annular member 20, while other portions thereof are received between the annular member 20 and the inner column 3.

Figure 12:
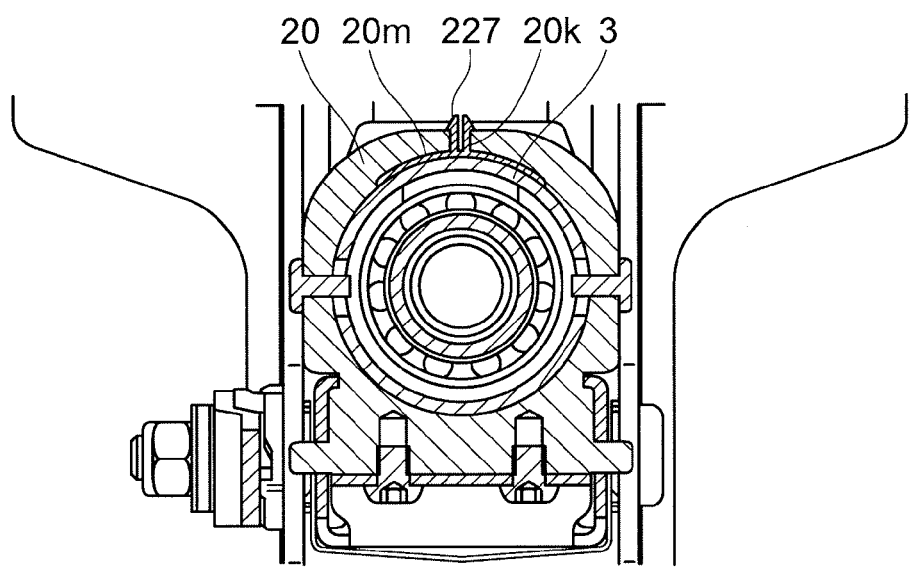
FIG. 12 is a sectional view illustrating a section, taken along a line 12-12 depicted in FIG. 11, of the steering apparatus according to the fourth embodiment of the present application.

FIG. 12 is a sectional view illustrating a section, taken along a line 12-12 illustrated in FIG. 11, of the steering apparatus 200 according to the fourth embodiment of the present application.

The resin pad 227 exclusive of the portion protruding upward from the upper portion of the annular member 20 is received within the upper hole 20k and the resin reservoir portion 20m of the annular member 20.

Figure 13:
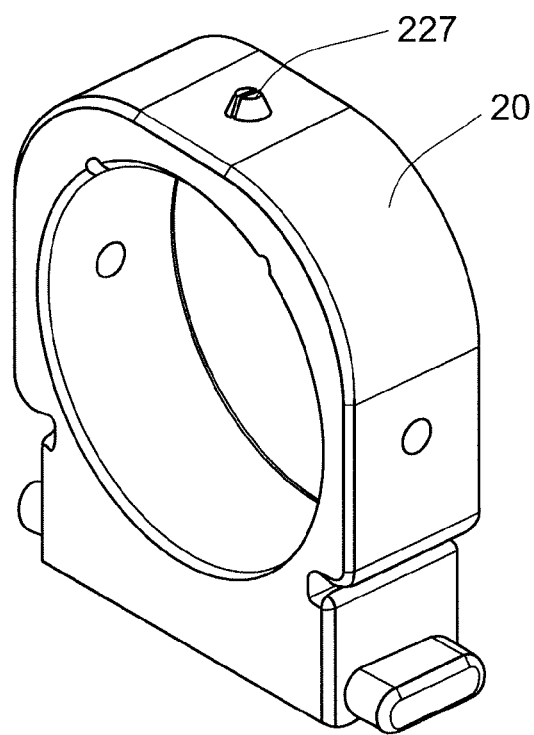
FIG. 13 is a perspective view illustrating an annular member fitted with a resin pad of the steering apparatus according to the fourth embodiment of the present application.

FIG. 13 is a perspective view illustrating the annular member 20 fitted with the resin pad 227 of the steering apparatus 200 according to the fourth embodiment of the present application.

The resin pad 227 is fitted to the upper portion of the annular member 20 from the inner diametrical side of the annular member 20, and thereafter the assembly is easily attained by fitting the annular member 20 on the inner column 3.

Figure 14A:
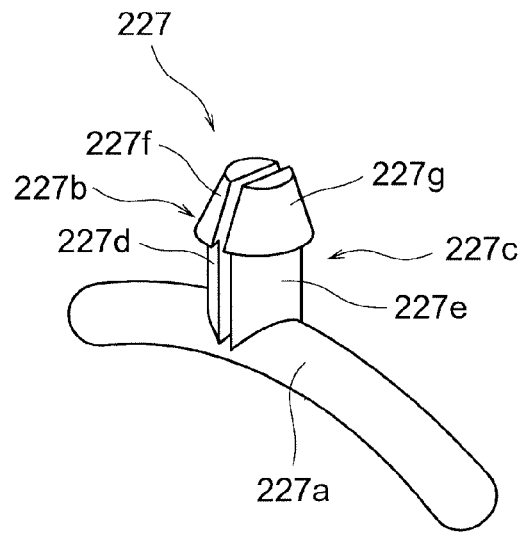
FIG. 14A is a perspective view illustrating a resin pad of the steering apparatus according to the fourth embodiment of the present application.
Figure 14B:
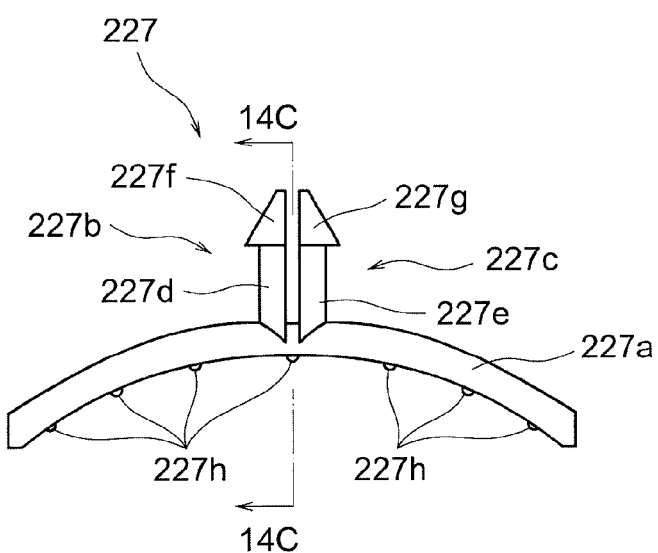
FIG. 14B is a front view thereof.
Figure 14C:
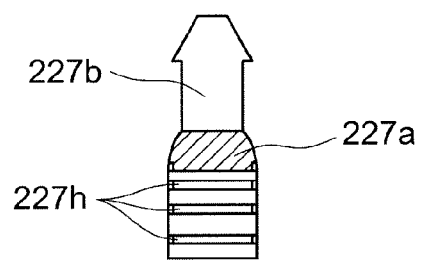
FIG. 14C is a sectional view taken along a line 14C-14C depicted in FIG. 14B.

FIGS. 14A, 14B and 14C are views each depicting the resin pad of the steering apparatus according to the fourth embodiment of the present application. FIG. 14A is a perspective view, FIG. 14B is a front view, and FIG. 14C is a sectional view taken along a line 14C-14C illustrated in FIG. 14B.

The resin pad 227 is made of resin and is configured to include a circular arc portion 227a received within the resin reservoir portion, and a couple of fixing portions 227b, 227c protruding upward from an upper central portion of the circular arc portion 227a and received within the upper hole.

The couple of fixing portions 227b, 227c are configured to respectively include: semicircular column portions 227d, 227e protruding upward from the upper central portion of the circular arc portion 227a to take substantially semicircular column shape; and fold-back portions 227f, 227g formed integrally with the upper portions of the semicircular column portions 227d, 227e and having conical surfaces increasing in diameter in a direction vertical to the circular column surfaces from the sides of the circular columns of the semicircular column portions 227d, 227e but decreasing in diameter toward the upper portions. Surfaces on the sides opposite to the conical surfaces of the fold-back portions 227f, 227g are plain faces being flush with the plain faces of the semicircular column portions 227d, 227e. The couple of fixing portions 227b, 227c are disposed with spaced apart so that the plain faces of these fixing portions take a face-to-face relationship with each other.

The couple of fixing portions 227b, 227c become elastically deformed to approach one another when fitting the resin pad 227 to the annular member 20 and, with the fold-back portions 227f, 227g being restored after passing through within the upper hole 20k, fix the resin pad 227 to the annular member 20.

A plurality of minute projections 227h projecting in the radial directions is provided on the lower surface of the circular arc portion 227a of the resin pad 227. The minute projections 227h each taking a semicircular column shape being elongate in the axial direction are disposed with their curved surfaces directed toward inner column 3. The minute projections 227h may be provided on the upper surface of the circular arc portion 227a. The minute projections 227h being thus provided, a variation in dimension of the inner column 3 can be absorbed. Further, the minute projections 227h are interposed between the inner column 3 and the annular member 20, thereby enabling a smooth relative movement between the inner column 3 and the annular member 20 upon the secondary collision.

According to the fourth embodiment, the same effects as those of the second embodiment can be acquired.

Note that the discussion has been made by exemplifying the specific embodiments for describing the invention of the present application, however, the invention of the present application can be modified and improved in a variety of modes without being limited to the fourth embodiment.

For example, as described above, the shearing pins 21a, 21b may be, though preferably provided in the vicinity of the connecting portion among the inner friction plate 23, the outer friction plates 24a, 24b and the annular member 20, provided at the lower portion of the annular member 20 and may also be provided at both of the bilateral portions and the lower portions thereof without being limited to the bilateral sides in the widthwise direction of the vehicle as in the embodiments discussed above. Moreover, the number of shearing pins may be set "1" or equal to or more than "3" without being limited to "2". Further, the shearing pins 21a, 21b are molded of resin to reduce the weight and can be thus sized to a degree not causing any obstacle against the assembly, and the come-off preventive molding can be also carried out. The metallic pins and the aluminum pins are also available for use.

Furthermore, as for the number of friction plates, without being limited to the two plates on one side with the intermediate friction plate being sandwiched, an available configuration is that the single friction plate is provided on one side without providing the intermediate friction plate or that the three or more friction plates are provided on one side while providing the two or more intermediate friction plates. Further, the friction plates may be disposed on any one side and may also be disposed outwardly of the side plate portions 6b, 6c of the vehicle-sided bracket 6.

Fifth Embodiment

Next, a fifth embodiment of the present application will be described. The fifth embodiment of the present application is different from the first embodiment in terms of only a point of disposing a resin pad 33 between the annular member 20 and the inner column 3 and a point of disposing a pin 21 on the lower portion of the annular member 20, and, with other configurations being the same as those of the first embodiment, an arrangement of the resin pad 33 and the pin 21 will be described by using the same reference numerals and symbols as those in the first embodiment while omitting the redundant explanations of the components other than the resin pad 33 and the pin 21.

Figure 15:
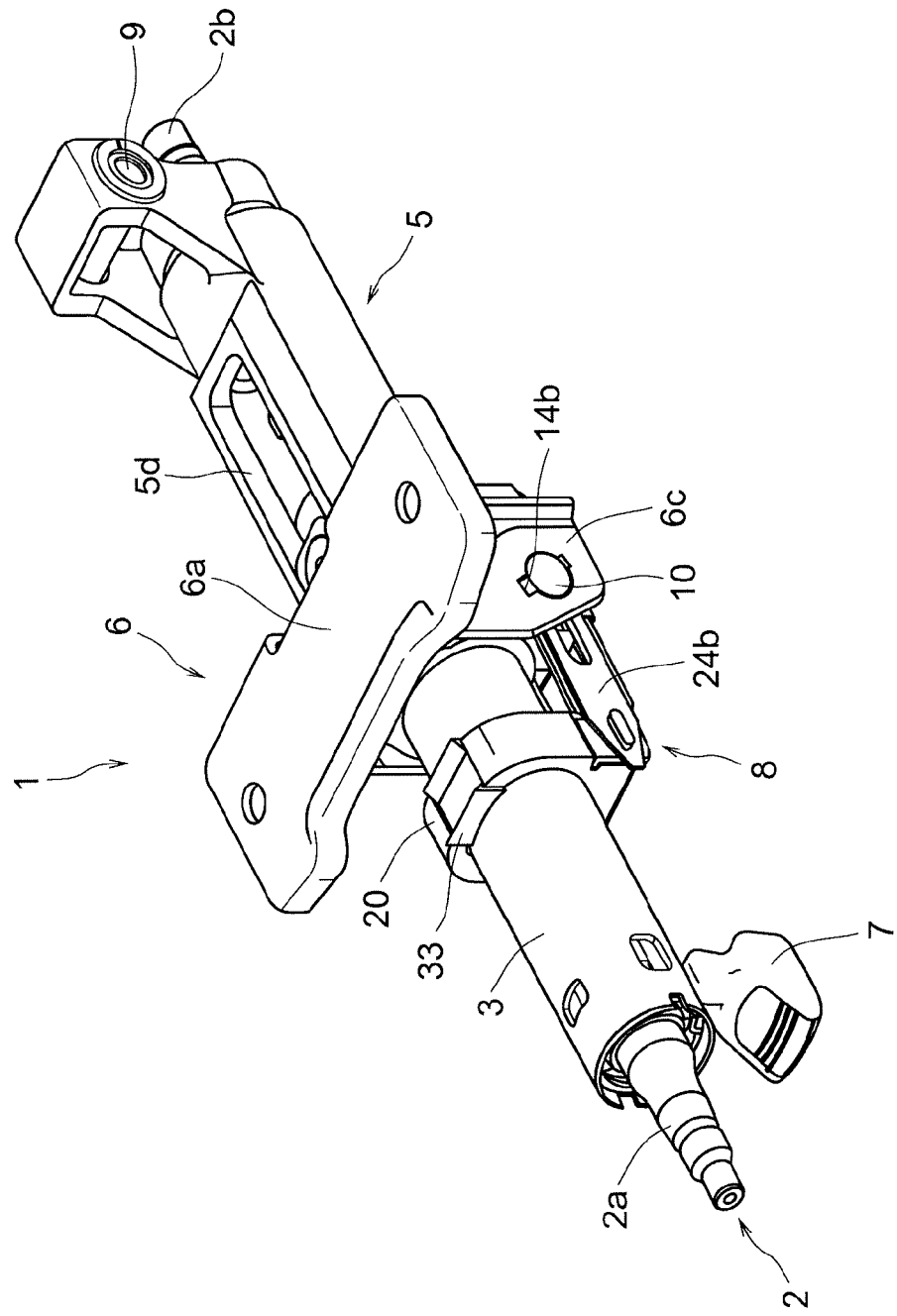
FIG. 15 is a perspective view illustrating the steering apparatus according to a fifth embodiment of the present application.

FIG. 15 is a perspective view illustrating the steering apparatus 1 according to the fifth embodiment of the present application. The resin pad 33 is disposed as illustrated in FIG. 15.

Figure 16:
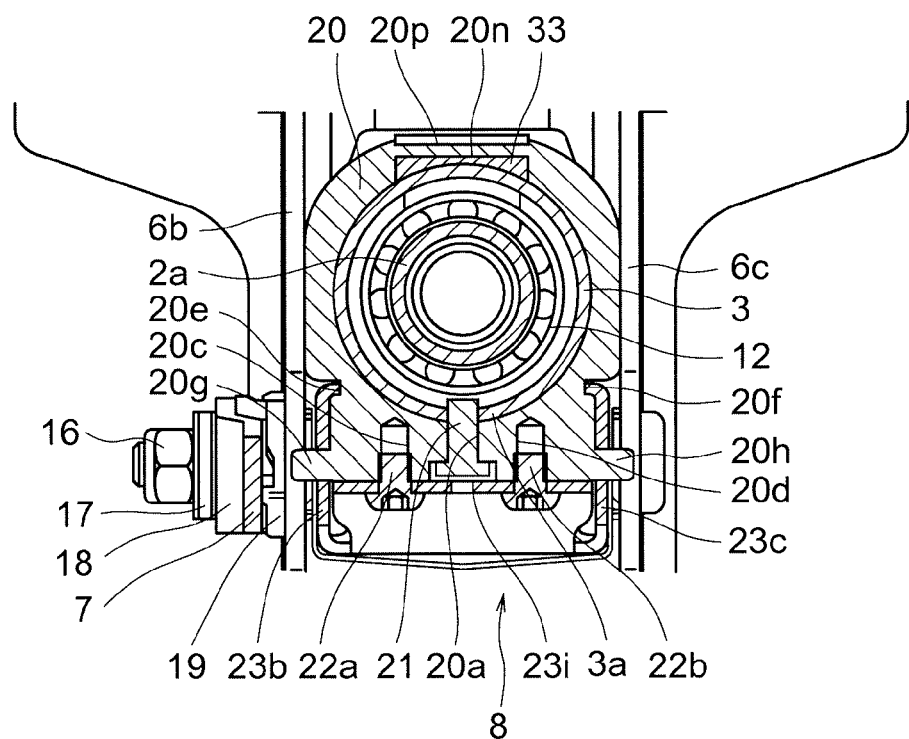
FIG. 16 is a sectional view illustrating a cut-off plane given when cutting off the steering apparatus according to the fifth embodiment of the present application vertically to the axial direction in a position of the annular member.

FIG. 16 is a sectional view illustrating a cut-off plane given when cutting off the steering apparatus according to the fifth embodiment of the present application vertically to the axial direction in a position of the annular member 20.

A clearance forming portion 20*n* being distant from the inner column 3 to form a space penetrating the annular member 20 in the axial direction, is formed in the upper portion of the annular member 20. The resin pad 33 composed of the resin is disposed as an elastic member between the clearance forming portion 20*n* and the inner column 3. The resin pad 33 enables the elimination of the backlash between the annular member 20 and the inner column 3.

The lower portion of the annular member 20 is formed thick in the radial directions, and is formed with a hole 20*a* penetrating vertically in the central portion thereof. A hole 3*a* is formed in a portion, opposite to the upper end of the hole 20*a*, of the inner column 3, the hole 3*a* configuring a through-hole penetrating an interior of the inner column 3 from the lower end of the annular member 20 continuously to the hole 20*a*. The hole 20*a* forms an internal space taking a substantially circular column shape, and a lower end thereof has a counterbore being larger in dimension of an inside diameter than those of other portions.

A resinous pin 21 having a shank taking a circular column shape and a disc-like head with a larger diameter than the shank passes through the through-hole configured to include the hole 20*a* of the annular member 20 and the hole 3*a* of the inner column 3, the pin 21 serving as a connection member to connect the annular member 20 and the inner column 3 together. The counterbore of the hole 20*a* receives the head of the pin 21.

Screw holes 20*c*, 20*d* are formed upward from downward on laterally both sides of the hole 20*a* of the annular member 20, and screws 22*a*, 22*b* are screwed into the screw holes 20*c*, 20*d* via after-mentioned holes 23*j*, 23*k* formed in the fitting portion 23*a* of the inner friction plate 23, thereby fitting the fitting portion 23*a* of the inner friction plate 23 to the annular member 20.

The fitting portion 23*a* of the inner friction plate 23 being thus fitted to the annular member 20, the annular member 20 is fixed integrally to the inner friction plate 23, and the pin 21 can be also prevented from coming off. A hole 23*i* is formed in a portion, facing the pin 21, of the fitting portion 23*a* of the inner friction plate 23. The hole 23*i* enables a visual check of the pin 21 being fitted in an assembling process etc.

Figure 17A:
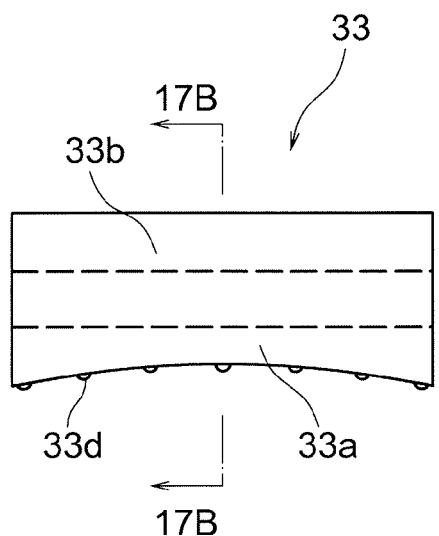
FIG. 17A is an enlarged front view illustrating the resin pad of the steering apparatus according to the fifth embodiment of the present application.
Figure 17B:
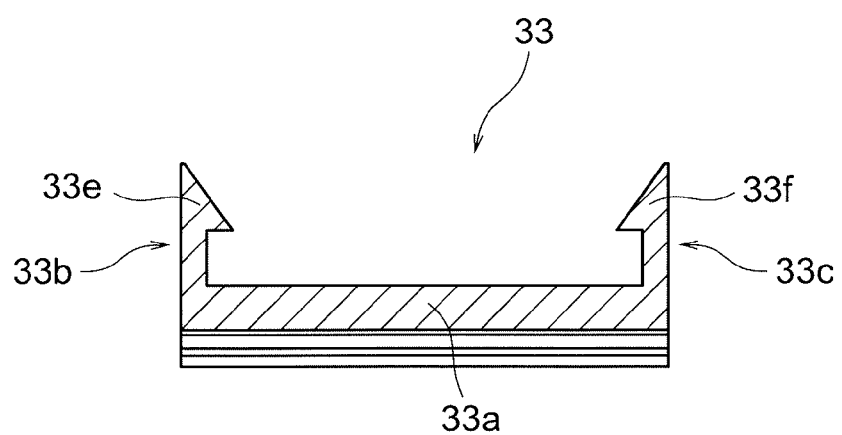
FIG. 17B is an enlarged sectional view taken along a line 17B-17B depicted in FIG. 17A.

FIGS. 17A and 17B are enlarged views each illustrating the resin pad 33 of the steering apparatus 1 according to the fifth embodiment of the present application. FIG. 17A is a front view depicting a state of the resin pad 33 as viewed from the driver's side when the steering apparatus 1 is mounted on the vehicle, and FIG. 17B is a sectional view take along a line 17B-17B illustrated in FIG. 17A.

The resin pad 33 includes: a base 33*a* disposed between the annular member 20 and the inner column 3; fixing portions 33*b*, 33*c* extending upward from portions, on the front and rear sides of the vehicle, of the base 33*a*; and a plurality of projections 33*d* formed on a lower surface of the base 33*a*.

The base 33*a* has an upper surface formed as a plain face and a lower surface formed as a curved face along the outer peripheral surface of the inner column 3.

The fixing portions 33*b*, 33*c* are formed over an entire length of the base 33*a* in the widthwise direction of the vehicle; stepped portions protruding more inward than a proximal portion are formed at face-to-face portions of the fixing portions 33*b*, 33*c*; and pawls 33*e*, 33*f* with widths being gradually reduced toward the upper portions from the stepped portions in the front and rear directions of the vehicle. Upon adjusting a direction and applying a force upward from the inner diametrical side of the annular member 20, the fixing portions 33*b*, 33*c* become deformed along inclined surface of the pawls 33*e*, 33*f* to be further separated from each other, and, as illustrated in FIG. 16, when the pawls 33*e*, 33*f* are forced to move over a recessed portion 20*p* of the annular member, the fixing portions 33*b*, 33*c* recover from the elastically deformed state to cause the pawls 33*e*, 33*f* to engage with the recessed portion 20*p*, with the result that the fixing portions 33*b*, 33*c* are fixed to the annular member 20.

Each projection 33*d* formed on the lower portion of the base 33*a* projects toward the inner column 3 and extends in the axial direction. The thus-provided projections 33*d* enable the resin pad 33 to contact both of the inner column 3 and the annular member 20 irrespective of the variation of the gap between the inner column 3 and the annular member 20, the variation being caused due to a tolerance of the outside diameter of the inner column 3 and a tolerance of the inside diameter of the annular member 20. Further, with this contrivance, an assembly work can be simplified. Still further, the projections, being provided long in the axial direction, the inner column 3 is allowed to smoothly move toward the front side of the vehicle when absorbing the impact of the secondary collision.

Upon the occurrence of the secondary collision that the driver collides with the steering wheel due to the collision of the vehicle, the impact force acting toward the front side of the vehicle is generated in the inner column 3. The impact force causes a fracture of the pin 21 such as shearing of the pin 21 or causes the deformation thereof, resulting in cancelling the fixation of the inner column 3 by the annular member 20. The inner column 3 is thereby enabled to move, i.e., to make a stroke toward the front side of the vehicle with only the friction with the clamp portion of the outer column 5.

The fifth embodiment is configured to eliminate the necessity for firmly clamping the inner column 3 by the clamp portion of the outer column 5 owing to the fixation of the inner column 3 by the annular member 20 and to moderate the clamping by the clamp portion of the outer column 5. With this contrivance, the inner column 3 receives the small friction force generated at the clamp portion of the outer column 5 against the inner column 3 upon the secondary collision, resulting in reducing a load to work an impact absorbing function. Moreover, the reinforcing unit 8 being integrally built up, the stable and low separating load is attained while preventing a twist of the steering column, the twist being caused due to a difference in separating load on the left side and the right side of the steering apparatus 1.

Further, in the fifth embodiment, the resin pad 33 being interposed over a broad range between the annular member 20 and the inner column 3, it is feasible to surely prevent the large friction force from being generated between the annular member 20 and the inner column 3 even when the load acting upward in the tilt direction is applied to the inner column 3 upon the secondary collision and to stably reduce the load to work the impact absorbing function.

Additionally, according to the fifth embodiment, the steering column does not come off even after absorbing the impact of the secondary collision and can be therefore steered.

The discussion has been made so far by exemplifying the specific embodiment for describing the invention of the present application, however, a variety of modifications and improvements can be attained without being limited to the fifth embodiment.

For example, the pins 21 for fixing the annular member 20 to the inner column 3 may be provided on laterally both sides and may also be provided at both of the bilateral portions and the lower portions thereof. Moreover, the number of pins may be set equal to or more than "3" without being limited to "1" or "2". Further, the pins 21 are molded of resin to reduce the weight and can be thus sized to a degree not causing any obstacle against the assembly, and the come-off preventive molding can be also carried out. Metallic pins and aluminum pins are also available for use as the pins 21.

Furthermore, as for the number of friction plates, without being limited to the two plates on one side with the intermediate friction plate being sandwiched, an available configuration is that the single friction plate is provided on one side without providing the intermediate friction plate or that the three or more friction plates are provided on one side while providing the two or more intermediate friction plates. Further, the friction plates may be disposed on any one side of the bilateral sides and may also be disposed outwardly of the side plate portions 6b, 6c of the vehicle-sided bracket 6.

Sixth Embodiment

Next, a sixth embodiment of the present application will be described. The sixth embodiment of the present application is different from the first embodiment in terms of only such a point that a support member 27 is disposed and that the inner column 3 is not formed with the hole receiving the insertion of the pin, and, with other configurations being the same as those of the first embodiment, the support member 27 and peripheral components thereof will be described by using the same reference numerals and symbols as those in the first embodiment while omitting the redundant explanations of the components other than the support member 27 and the peripheral components thereof.

Figure 18:
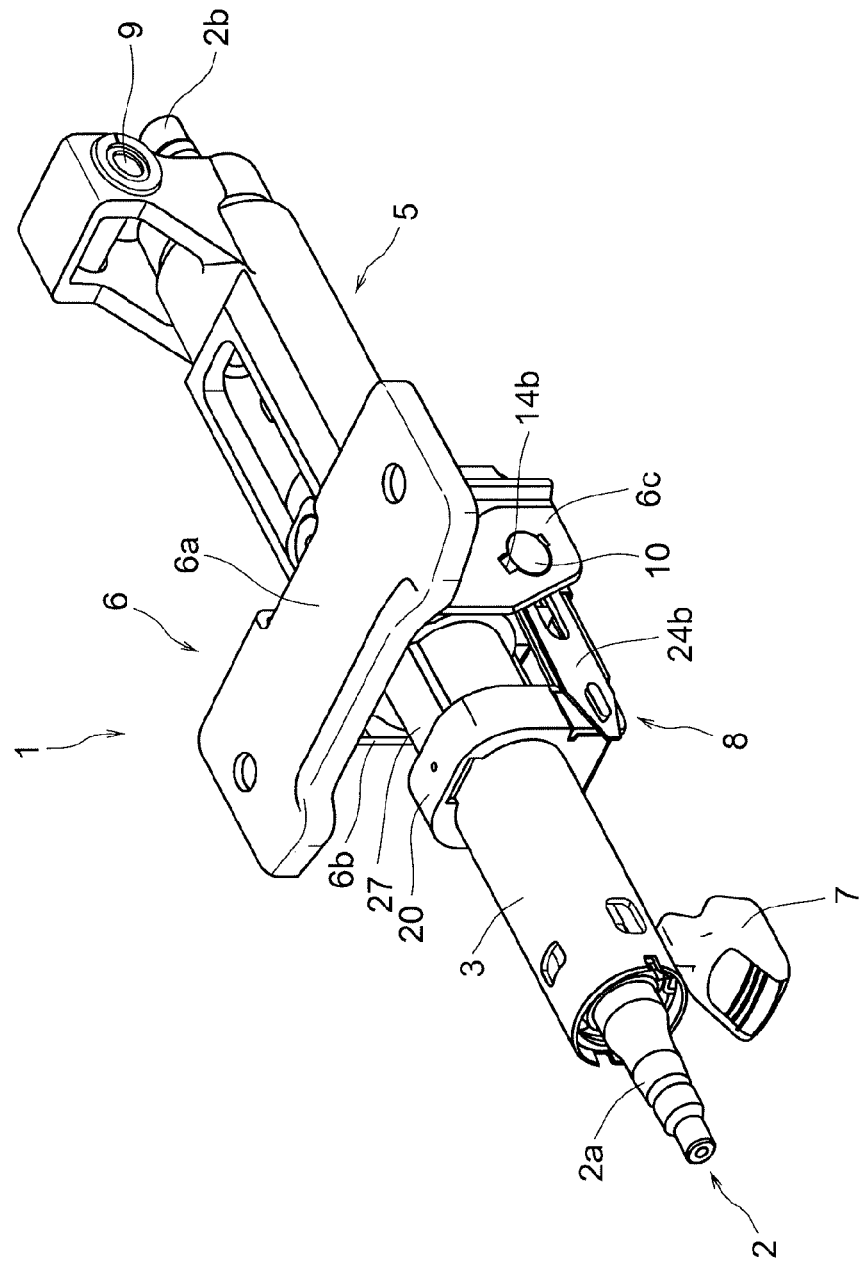
FIG. 18 is a perspective view illustrating the steering apparatus according to a sixth embodiment of the present application.

FIG. 18 is a perspective view illustrating a steering apparatus according to the sixth embodiment of the present application. The support member 27 is disposed as illustrated in FIG. 18.

Figure 19:
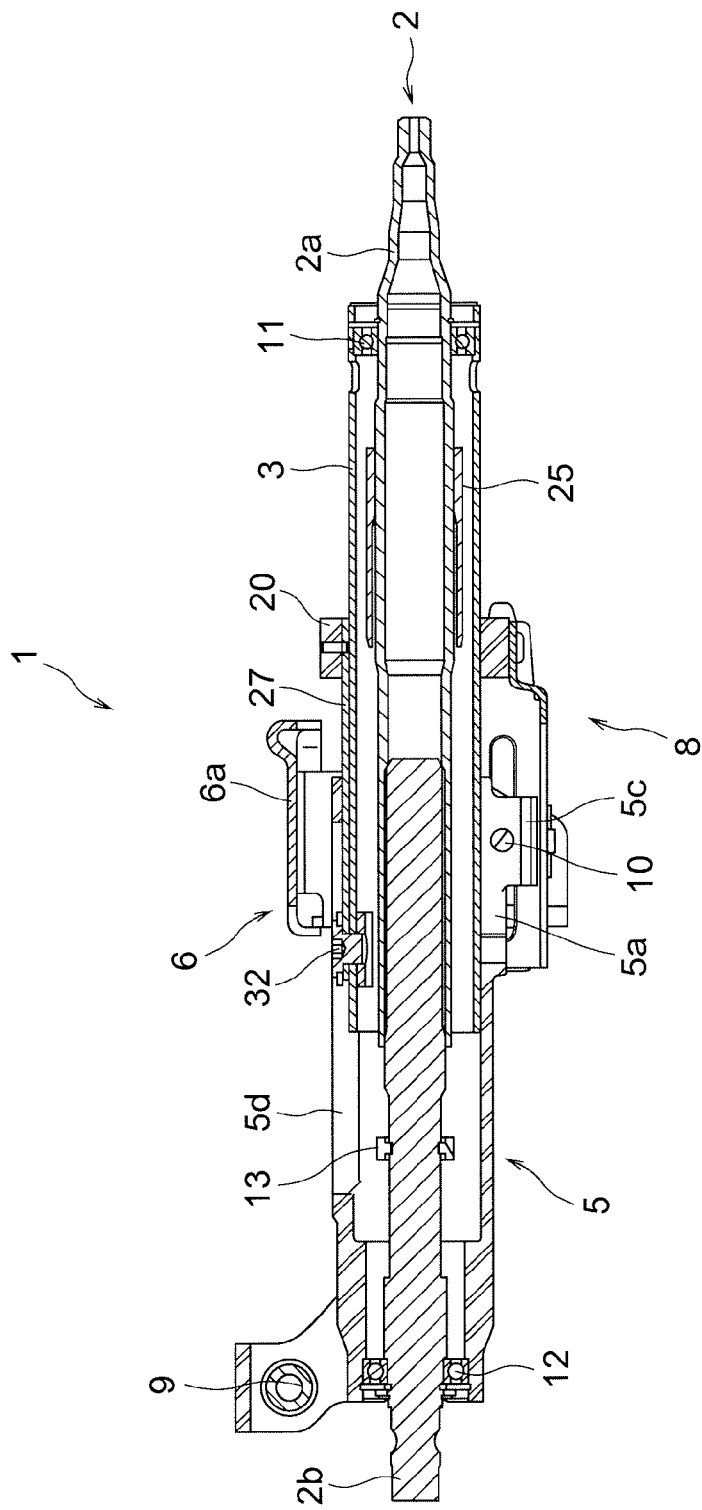
FIG. 19 is a sectional view illustrating a vertical cut-off plane along the central axis of the steering apparatus according to the sixth embodiment of the present application.

FIG. 19 is a sectional view illustrating a cut-off plane given when cutting off the steering apparatus according to the sixth embodiment of the present application vertically along the central axis thereof. The support member 27 taking a plate shape being long in the axial direction is disposed on an upper side of the inner column 3, a portion, on the front side of the vehicle, of the support member 27 is fixed together with the stopper 32 to the inner column 3, and a portion, on the rear side of the vehicle, of the support member 27 is disposed between the annular member 20 and the inner column 3.

Figure 20:
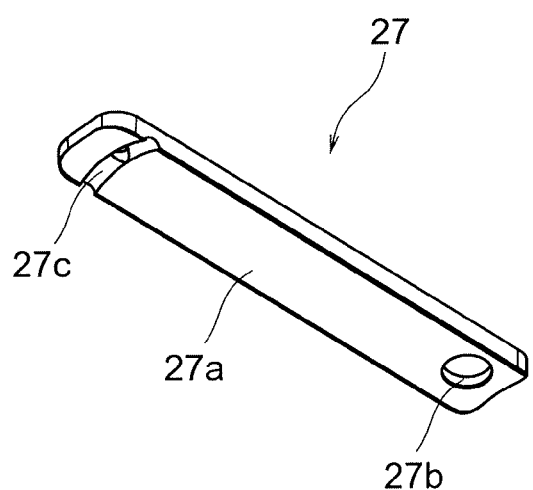
FIG. 20 is a perspective view illustrating a support member of the steering apparatus according to the sixth embodiment of the present application.

FIG. 20 is a perspective view illustrating the support member 27 of the steering apparatus 1 according to the sixth embodiment of the present application. The leftward upper side as facing the drawing corresponds to the rear side of the vehicle, while the rightward lower side as facing the drawing corresponds to the front side of the vehicle.

The support member 27 is a plate member taking a substantially rectangular shape being long in the axial direction, and has a lower surface 27a formed as a curved surface being curved in accordance with a curvature to be tightly fitted to the outer peripheral surface of the inner column 3. Further, a first hole portion 27b penetrating the support member 27 in a plate thicknesswise direction is formed in the vicinity of the end portion, on the front side of the vehicle, of the support member 27, and a groove portion 27c extending in the widthwise direction of the vehicle is formed in the vicinity of an end portion, on the rear side of the vehicle, of the lower surface 27a.

FIGS. 21A, 21B, 21C, 21D and 21E are views each illustrating the support member 27 of the steering apparatus 1 according to the sixth embodiment of the present application. FIG. 21A depicts a side surface on the front side of the vehicle; FIG. 21B depicts a side surface on the left side; FIG. 21C depicts the lower surface 27a; FIG. 21D depicts a side surface on the right side; and FIG. 21E depicts a side surface on the rear side of the vehicle.

The upper surface 27d of the support member 27 is formed as a plain face.

A second hole portion 27e penetrating in the plate thicknesswise direction is formed in an inner central portion of the groove portion 27c.

Figure 22A:
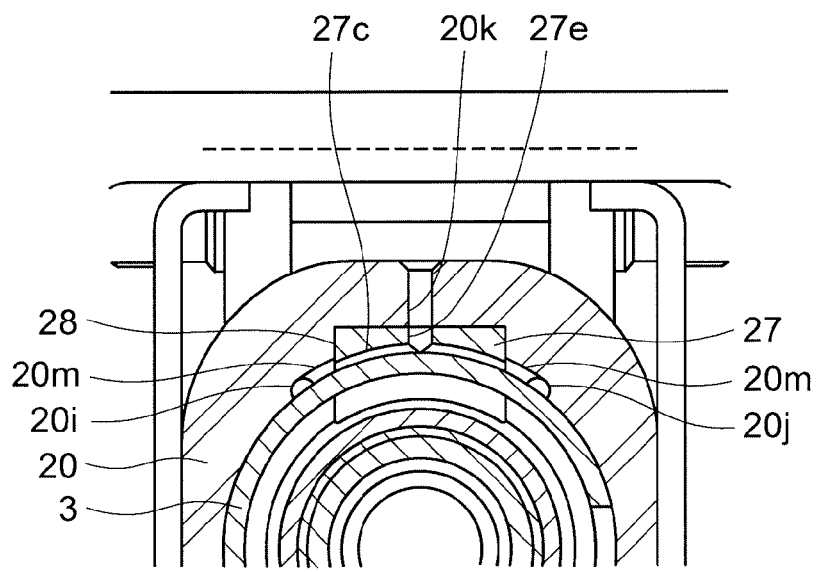
FIG. 22A is an enlarged sectional view of a periphery to the support member of the steering apparatus according to the sixth embodiment of the present application, illustrating a state before the filling of the resin.
Figure 22B:
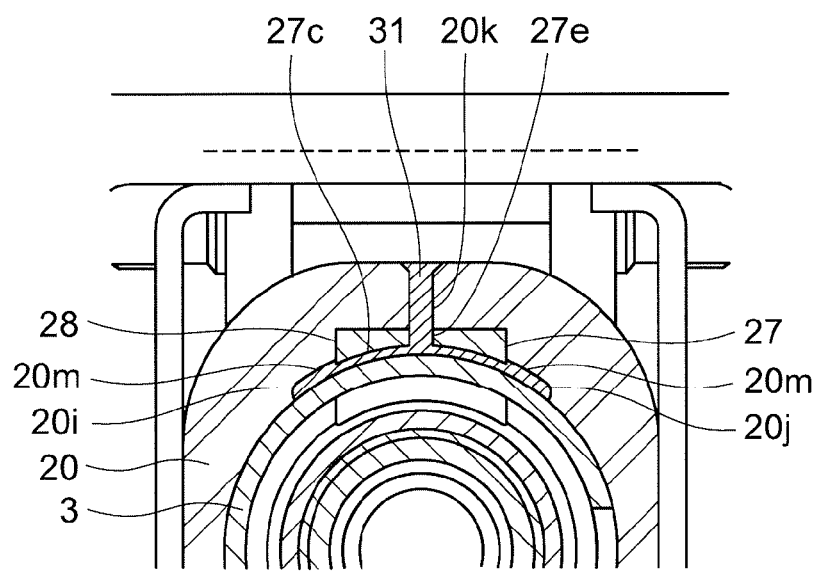
FIG. 22B is an enlarged sectional view illustrating a state after the filling of the resin.

FIGS. 22A and 22B are enlarged sectional views each illustrating the periphery to the support member 27 of the steering apparatus 1 according to the sixth embodiment of the present application. FIG. 22A depicts a state before performing the injection-molding of the resin 31, and FIG. 22B depicts a state after having performed the injection-molding of the resin 31.

The end portion, on the rear side of the vehicle, of the support member 27 is, as illustrated in FIG. 22A, received between a support member receiving portion 28 formed in the annular member 20 and the inner column 3, and the second hole portion 27e configures a through-hole portion penetrating up to the inner column 3 in continuation to the injection hole 20k formed in the annular member 20. Further, the resin reservoir portions 20m separated from the inner column 3 to form gaps are formed on laterally both sides of the support member 27, and the air vent portions 20i, 20j are formed respectively on the outsides of the resin reservoir portions 20m in the widthwise direction of the vehicle. The air vent portions 20i, 20j penetrate the annular member 20 in the axial direction and lead the air within the injection hole 20k, the second hole portion 27e, the groove portion 27c and the resin reservoir portions 20m to the outside when performing the injection-molding of the resins 31.

Upon injecting the resin 31 into the injection hole 20k, the resin 31 flows between the groove portion 27c and the inner column 3 from the second hole portion 27e and thus fills, as illustrated in FIG. 22B, the interiors of the injection hole 20k, the second hole portion 27e, the groove portion 27c, the resin reservoir portions 20m and the air vent portions 20i, 20j. The annular member 20 and the inner column 3 are fixed together via the shearing pins composed of the resin filling the interiors of the injection hole 20k and the second hole portion 27e. A secure filling of the resin can be attained by injecting the resin 31 till overflowing from the air vent portions 20i, 20j. The filling of the resin 31 enables the annular member 20 and the support member 27 to be connected together and simultaneously the backlash between the annular member 20 and the inner column 3 to be eliminated.

Figure 23:
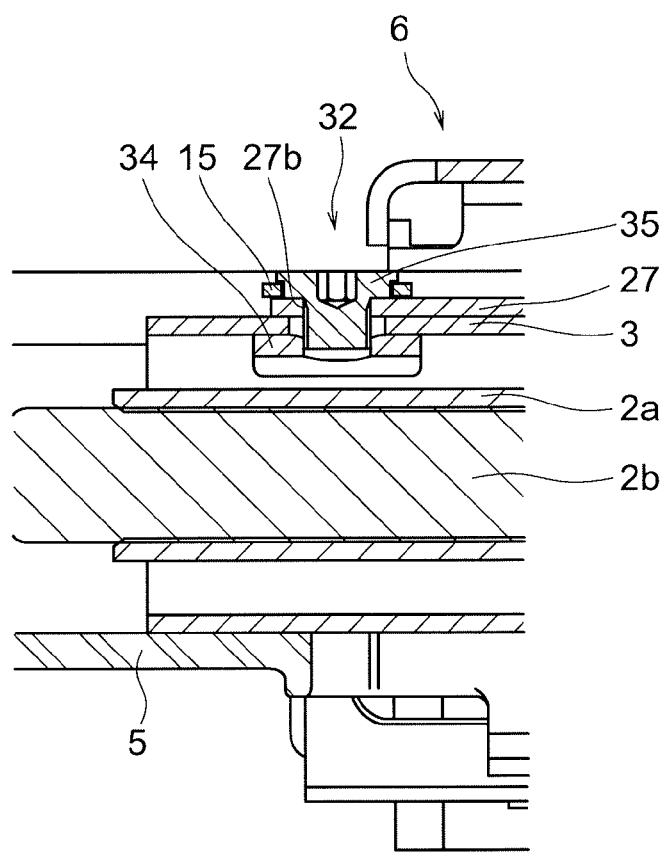
FIG. 23 is an enlarged sectional view illustrating a periphery to a stopper in the section, depicted in FIG. 19, of the steering apparatus according to the sixth embodiment of the present application.

FIG. 23 is an enlarged sectional view illustrating the periphery to a stopper 32 in the section of the steering apparatus 1 depicted in FIG. 19 according to the sixth embodiment of the present application.

The stopper 32 is configured to include: a bolt 35 passing through within a hole formed in penetration in the inner column 3 in the radial direction and the first hole portion 27b of the support member 27; an abutment plate 34 disposed within the inner column 3 and formed with a female thread to which the bolt 35 is screwed; and an annular resin spacer 15 fitted on a head of the bolt 35 and positioned between a diameter-enlarged portion formed at an upper portion of the head of the bolt 35 and the support member 27. The resin spacer 15 being composed of the resin, it is feasible to restrain the noises caused when making the telescopic adjustment.

The support member 27 is fixed to the inner column 3 by the bolt 35 as described above.

Upon the occurrence of the secondary collision that the driver collides with the steering wheel due to the collision of the vehicle, the impact force acting toward the front side of the vehicle is generated in the inner column 3. The impact force is exerted on the support member 27 fixed to the inner column 3. When the support member 27 receives a fixed or larger level of impact force, the resin 31 is sheared, the resin 31 filling the interior of the injection hole 20k formed in the annular member 20 and the interior of the second hole portion 27e formed in the support member 27 to configure the shearing pins. The support member 27 can be thereby separated from the annular member 20, and the inner column 3 is enabled to move, i.e. to make the stroke toward the front side of the vehicle in the axial direction while resisting only the friction force with the clamp portion of the outer column 5. Further, in the sixth embodiment, the inner column 3 is fixed by the reinforcing unit 8, thereby eliminating the necessity for firmly clamping the inner column 3 with the clamp portion of the outer column 5 and moderating the clamping by the clamp portion of the outer column 5. With this contrivance, the inner column 3 receives the reduced friction force generated between the inner column 3 and the clamp portion of the outer column 5 and also the reduced separating load upon the secondary collision.

The thus-configured steering apparatus 1 according to the sixth embodiment of the present application is capable of absorbing the impact with the stable and low separating load even when the vehicle occupant having the relatively light weight encounters the secondary collision.

Moreover, the steering apparatus 1 according to the sixth embodiment is capable of steering because of the column not coming off even after absorbing the impact of the secondary collision.

Furthermore, the steering apparatus 1 according to the sixth embodiment is capable of smoothening the stroke upon the separation by preventing the deformation of the inner column 3 and maintaining the roundness thereof because of having no necessity for working the hole in the inner column 3 at the junction between the inner column 3 and the annular member 20.

Still further, the steering apparatus 1 according to the sixth embodiment is capable of improving, with the reinforcing unit 8 firmly fixing the inner column 3, the rigidity of the column against the vibrations and ensuring the steering stability.

Yet further, the steering apparatus 1 according to the sixth embodiment is capable of preventing, with the inner friction plate 23 and the outer friction plates 24a, 24b being integrally configured via the annular member 20, the friction-based fixing force from being different on the left side and the right side, and also preventing the separating load from increasing due to the column being twisted upon the secondary collision.

Still yet further, the steering apparatus 1 according to the sixth embodiment is capable of preventing, with the resin 31 being interposed between the annular member 20 and the inner column 3, the separating load from increasing even when the load is applied to the column to move upward upon the secondary collision, and acquiring the stable separating load without the variation thereof.

Figure 24:
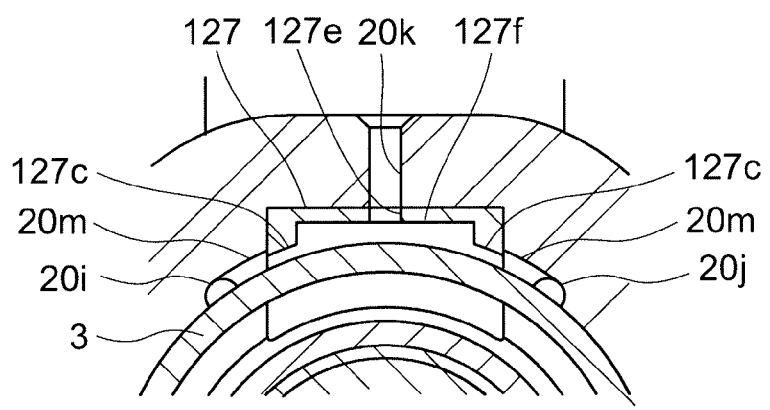
FIG. 24 is an enlarged sectional view illustrating the periphery to the support member of the steering apparatus according to a modified example of the sixth embodiment of the present application.

FIG. 24 is an enlarged sectional view illustrating the periphery to the support member 127 of the steering apparatus according to a modified example of the sixth embodiment. The present modified example is different from the steering apparatus 1 according to the sixth embodiment in terms of only a shape of the support member, and hence the shape of the support member 127 according to the modified example will be described by using the same reference numerals and symbols as those in the sixth embodiment while omitting the redundant explanations of other components of the steering apparatus.

A support member 127 according to the modified example has substantially the same configuration as the foregoing support member 27 has but is different from the support member 27 in terms of a point that resin reservoir portions 127f extending on laterally both sides from a second hole portion 127e in a lower surface of the support member 127.

The support member 127 according to the modified example includes the resin reservoir portions 127f formed to extend on laterally both sides from the second hole portion 127e and includes groove portions 127c, formed on laterally both sides thereof, via which internal spaces formed between the resin reservoir portions 127f and the inner column 3 are led in continuation to laterally both sides along the inner column 3.

The resin reservoir portion 20m formed in the annular member 20 is disposed outwardly of the groove portion 127c, and the air vents 20i, 20j are formed further outwardly thereof.

In the modified example also, similarly to the sixth embodiment, the resin is injection-molded in the interiors of the injection hole 20k, the second hole portion 127e, the resin reservoir portion 127f, the groove portion 127c, the resin reservoir portion 20m and the air vents 20i, 20j.

According to the modified example, it is feasible to attain, in addition to the same effects as those of the steering apparatus 1 according to the sixth embodiment, the more stable and lower separating load upon the secondary collision by reducing the friction caused between the support member 127 and the inner column 3 via the resin filling the resin reservoir portion 127f formed in the support member 127.

The discussion has been made so far by exemplifying the specific embodiment for describing the invention of the present application, however, a variety of modifications and improvements can be attained without being limited to the sixth embodiment.

For example, the support member 27 is not necessarily clamped together with the stopper 32 and may be fixed to the inner column 3. Further, the annular member 20 and the support member 27 can be also provided on the front side of the vehicle.

Moreover, in stead of fixing the annular member 20 and the support member 27 by use of the injection-molded resin, the shearing members, which are sheared by a fixed level of shearing force, can be also used. For instance, a shearing pin molded previously from resin may be inserted into the injection hole 20k and the second hole portion 27e.

Furthermore, as for the number of friction plates, without being limited to the two plates on one side with the intermediate friction plate being sandwiched, the available configuration is that the single friction plate is provided on one side without providing the intermediate friction plate or that the three or more friction plates are provided on one side while providing the two or more intermediate friction plates. Further, the friction plates may be disposed on any one side and may also be disposed outwardly of the side plate portions 6*b*, 6*c* of the vehicle-sided bracket 6.

As described above, the present invention can provide the steering apparatus capable of acquiring the more stable and lower separating load.

DESCRIPTION OF THE REFERENCE NUMERALS AND SYMBOLS 1, 200: steering apparatus
2: steering shaft
2*a*: upper shaft
2*b*: lower shaft
3: inner column
3*a*, 3*b*: through-hole
5: outer column
5*d*: elongate hole portion
6: vehicle-sided bracket
6*a*: upper plate portion
6*b*, 6*c*: side plate portion
7: operation lever
8: reinforcing unit
9: tilt pivot
10: clamping bolt
11: rear-sided bearing
12: front-sided bearing
13: stopper
14*a*, 14*b*: elongate hole
15: spacer
16: nut
17: thrust bearing
18: movable cam
19: fixed cam
20: annular member
20*a*, 20*b*: through-hole
20*c*, 20*d*: screw hole
20*e*, 20*f*: recessed portion
20*g*, 20*h*: protruded portion
20*i*, 20*j*: air vent portion
20*k*: injection hole
20*m*: resin reservoir portion
20*n*: clearance forming portion
20*p*: recessed portion
21: pin
21*a*, 21*b*: shearing pin
22*a*, 22*b*: screw
23: inner friction plate
23*a*: fitting portion
23*b*, 23*c*: rising portion
23*d*, 23*e*: open slot
23*f*, 23*g*: elongate hole portion
23*h*: lower surface portion
24*a*, 24*b*: outer friction plate
25*a*, 25*b*: elongate hole portion
26*a*, 26*b*: elongate hole portion
27: support member
27*a*: lower surface
27*b*: first hole portion
27*c*, 127*c*: groove portion
27*d*: upper surface
27*e*: second hole portion
28: support member receiving portion
29: resin
30: intermediate friction plate
30*a*, 30*b*: friction portion
30*c*: connecting portion
30*d*, 30*e*: round hole
31: resin
32: stopper
33: resin pad
33*a*: base
33*b*, 33*c*: fixing portion
33*d*: projection
33*e*, 33*f*: pawl
34: abutment plate
35: bolt
127*f*: resin reservoir portion
227: resin pad
227*a*: circular arc portion
227*b*, 227*c*: fixing portion
227*d*, 227*e*: semicircular column portion
227*f*, 227*g*: fold-back portion
227*h*: minute projection

What is claimed is:

1. A steering apparatus comprising:
a steering shaft transferring steering force;
an inner column rotatably supporting a portion, on a rear side of a vehicle, of the steering shaft;
an outer column rotatably supporting a portion, on a front side of the vehicle, of the steering shaft and including: a clamp portion slidably fitted onto the inner column and clamping and declamping the inner column; and a tilt pivot disposed on the front side of the vehicle and rotatably fitted to a vehicle body;
a vehicle-sided bracket pinching and fixing both sides of the clamp portion in a widthwise direction of the vehicle to the vehicle body and unlocking the locked clamp portion, and making the inner column and the outer column pivotable about the tilt pivot; and
a clamping bolt for clamping the clamp portion and the vehicle-sided bracket in the widthwise direction of the vehicle corresponding to an operation of a user, and declamping the clamp portion and bracket,
wherein the steering apparatus further comprises: a friction plate having an elongate hole extending in an axial direction and receiving insertion of the clamping bolt and being clamped by the clamping bolt together with the clamp portion and the vehicle-sided bracket to extend toward the rear side of the vehicle in the axial direction; and a holding member fitted on the inner column and connected to a portion, on the rear side of the vehicle, of the friction plate,
the holding member and the inner column are connected together via a shearing pin, and
the shearing pin is sheared into fracture upon receiving a predetermined level of impact force.

2. The steering apparatus according to claim 1, further comprising a second shearing pin connecting the holding member and the inner column together, the shearing pin and the second shearing pin being disposed in a face-to-face relationship in a widthwise direction of a vehicle.

3. The steering apparatus according to claim 1, wherein the holding member takes an annular shape to receive internal fitting of the inner column, and
a resin is interposed between an upper portion of the holding member and the inner column.

4. The steering apparatus according to claim 3, wherein the resin is injection-molded after the inner column has been fitted in the holding member.

5. The steering apparatus according to claim 3, wherein the resin has a fixing portion making use of elasticity thereof and is fixed to the holding member via the fixing portion after being molded.

6. The steering apparatus according to claim 5, wherein the fixing portion engages with a hole formed to penetrate the holding member in a radial direction.

7. The steering apparatus according to claim 5, wherein the fixing portion embraces the upper portion of the holding member from an inside in the radial direction of the holding member.

8. The steering apparatus according to claim 7, further comprising a support member fixed to the inner column, at least a part of the support member being interposed between the holding member and the inner column, the shearing pin being received in a through-hole portion formed through the support member and the holding member.

* * * * *